(12) United States Patent
Lindholm et al.

(10) Patent No.: US 7,773,598 B2
(45) Date of Patent: Aug. 10, 2010

(54) ARRANGEMENT AND A METHOD RELATING TO FLOW OF PACKETS IN COMMUNICATIONS SYSTEMS

(75) Inventors: Fredrik Lindholm, Alvsjo (SE); Henrik Basilier, Taby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 548 days.

(21) Appl. No.: 11/722,182

(22) PCT Filed: Dec. 21, 2004

(86) PCT No.: PCT/SE2004/001980

§ 371 (c)(1), (2), (4) Date: Jun. 20, 2007

(87) PCT Pub. No.: WO2006/068548

PCT Pub. Date: Jun. 29, 2006

(65) Prior Publication Data

US 2008/0002579 A1    Jan. 3, 2008

(51) Int. Cl.
*H04L 12/56* (2006.01)
(52) U.S. Cl. ................................. 370/392; 370/401
(58) Field of Classification Search .................. None
See application file for complete search history.

(56) References Cited

U.S. PATENT DOCUMENTS

| | | | |
|---|---|---|---|
| 6,061,355 A | 5/2000 | Kusano | |
| 6,785,291 B1 * | 8/2004 | Cao et al. | 370/431 |
| 7,088,719 B2 | 8/2006 | Brown et al. | |
| 7,483,374 B2 * | 1/2009 | Nilakantan et al. | 370/235 |
| 2002/0152209 A1 * | 10/2002 | Merugu et al. | 707/7 |
| 2003/0198189 A1 * | 10/2003 | Roberts et al. | 370/252 |
| 2004/0100904 A1 * | 5/2004 | Chander et al. | 370/235 |
| 2004/0184453 A1 | 9/2004 | Moriwaki | |
| 2005/0129019 A1 * | 6/2005 | Cheriton | 370/392 |

FOREIGN PATENT DOCUMENTS

EP    1365546    5/2002

* cited by examiner

*Primary Examiner*—Gregory B Sefcheck
*Assistant Examiner*—Daniel Mitchell

(57) ABSTRACT

An arrangement, system, and method for switching data packet flows in a communication system. A flow processing core classifies packet flows and defines processing flow sequences applicable to the packet flows. A distributing arrangement directs the packet flows to appropriate functional units or processors according to each packet flow's applicable processing flow sequence. The current position of each packet flow in its respective processing flow sequence is indicated. Packet flow sequence information may be determined so that reclassification of already classified packets is avoided.

25 Claims, 14 Drawing Sheets

ARRANGEMENT AND A METHOD RELATING TO FLOW OF PACKETS IN COMMUNICATIONS SYSTEMS

FIELD OF THE INVENTION

The present invention relates to an arrangement comprising means for handling switching of data packets or flows of data packets in a communication system supporting communication of packet data to functional or processing units or arrangements performing operations on the data packets. The invention also relates to a system comprising a plurality of said arrangements as well as to a method for handling switching of data packets or flows of data packets in a communication system supporting communication of packet data to functional or processing units or arrangements for performing operations on the data packets.

STATE OF THE ART

In data communication systems it is currently getting more or more common to use so called "network middleboxes" which perform operations on end-to-end IF flows, such as charging data collection, authorization, policing, QoS control etc. Such solutions can be said to be monolithic solutions where a central node is collecting or searching for all information that is needed. This means that a large amount of functionality is integrated in one node or one arrangement, which is not very convenient for several reasons. Such a system is very inflexible, the load on such nodes is very high. If a packet or a packet flow has to go through a number of operations or processing steps, the packet(s) passes from one node, unit or arrangement to another, even if the packet does not have to be processed by each of these arrangements. However, since the arrangements can be said to be arranged in series, the whole processing chain will be interrupted if the "weakest" node or arrangement crashes or gets overloaded or somehow is malfunctioning. Furthermore, in each unit or each arrangements the packets have to be inspected and then classified before they are handled, which is time-consuming, inflexible and costly. It is clearly disadvantageous that a new decision making process is required in every step, and a lot of operations, such as classification, examination etc. of packets and packet flows, have to be repeated over and over again, not to mention the situation that occurs if the weakest link in the chain breaks down or similar. Such problematics or such situations tend to become more and more frequent due to the rapidly increasing number of added services and capabilities that are offered to communication systems of today supporting communication of packet data.

SUMMARY OF THE INVENTION

What is needed is therefore an arrangement as initially referred to, through which data packets or flows of data packets can be switched in an efficient and flexible manner. More particularly an arrangement is needed through which packet data or packet data flows, e.g. IP flows, can be switched through several processing functions, particularly without producing any unnecessary load on any nodes or arrangements in the system, and even more particularly in a fast manner without giving rise to unnecessary delays. Still further an arrangement is needed which allows for by-passing of functions, processing arrangements or units, which are not relevant for the concerned packets or packet flows. Most advantageously such by-passing shall also be possible to fulfill while using substantially completely open interfaces to the units or arrangements performing the actual payload processing.

Most particularly an arrangement is needed through which efficient and flexible switching as referred above can be provided for using standard protocols such as TCP/IP (Transport Control Protocol/Internet Protocol) and Ethernet protocol or a protocol with a similar functionality. Particularly an arrangement is needed which enables a consistent switching, i.e. a "scheme" which can be determined and withheld. Still further, particularly, an arrangement is needed which is capable of taking several different factors into account during the switching or processing sequence, such as user, service type, access type etc.

Therefore an arrangement as initially referred to is provided, which comprises core processing means with classifying means for classifying packets or packet flows to define the processing sequence applicable for the packets or packet flows, distributing means for distributing or switching the packets or packet flows to the appropriate functional units or processing arrangements according to the applicable processing sequence, indication providing means for providing an indication relating to the current position of the respective packets or packet flows in the respective applicable processing sequence, and means for fetching or retrieving packet flow sequence information such that re-classification of already classified packets can be avoided. Particularly, if variable binding, as will be discussed more thoroughly below, is implemented it is possible to obtain a "one-time classification".

The distributing means particularly comprises or communicates with forwarding control means responsible for taking the decision of switching/distributing a classified packet of a packet flow. Particularly said decision is made by flow detection and control means in said flow processing core.

In order to facilitate understanding of the present documents, a few concepts as used in the present document, will be briefly defined. A Logical Network is a concept used to virtualize the space in which a function including keeping and/or obtaining and using information about a number of factors such as user, service provided or requested, access type is implemented. A Logical Network may for example correspond to a virtual private network and it can be used to enable operation in overlapping address spaces, which is particularly useful for example for enterprise services.

A flow is particularly uniquely identified by an arrangement according to the present invention or particularly the core processing means, by the 5-tuple of an IP header (source/destination IP address, source/destination port number and protocol id) and possibly also other information needed to make the flow unique, identify the origin, i.e. where it came from etc. It may for example be a VLAN (Virtual Logical Area Network) tag in embodiments wherein VLAN tagging is supported. It should however be clear that the inventive concept also covers other flows identified in other manners, but the present definition of concept etc., is given to facilitate the understanding of some preferred embodiments of the present invention.

A Logical Address (LA) is used to represent an action that a processing function, unit or arrangement can perform on a flow. Particularly processing functions register the logical addresses they serve with the forwarding means, particularly internal forwarding means or forwarding control means.

An External Entity is an arrangement or device or a box that takes part in the processing of a flow, but which does not support internal forwarding protocols used for example within an arrangement (or between arrangements) according to the invention. Such an External Entity may for example be a third party component such as an optimizer or similar.

Processing function variables is a concept that is introduced and it is explained as follows: Data needs to be passed to the flow processing functions/units/arrangements. This can be done in substantially two ways. Data can be sent by the control means to the processing function directly (e.g. pre-provisioned). Some data however needs to be determined dynamically, i.e. such data can be said to comprise variables, particularly on a flow-by-flow basis for example a flow unique tag or a charging class etc. In order to avoid additional packet inspection, the flow processing core can send such variables (values) with the flow to the respective processing function. Such data can be bound to the flow upon classification through variable binding. Generic as well as processing function specific variables (data) can be bound to a flow at inspection. Such binding may be expressed in filtering rules. Examples of generic variables that can be bound and/or changed are direction and user IP address, in case the IP address is not found in source or destination IP address. Processing specific data variables may for example be QoS class or charging Id/key.

It should be clear that these definitions are not given for limitational purposes but they are given in order to facilitate understanding of some of the embodiments of the present invention.

In a particular embodiment of the present invention the flow processing core (FPC) comprises (one or more) functional processing means for performing at least one payload processing functionality. Such a processing functionality may comprise a firewall related processing functionality or NAPT (Network Address Part Translation). It should also be clear that the invention is not limited to embodiments in which the core processing means do comprise functional processing means.

The arrangement most particularly comprises internal forwarding means supporting a forwarding protocol for forwarding data packets to other units or arrangements supporting the same forwarding protocol. In a particularly advantageous embodiment the classifying means comprises or are associated with means for adding metadata information to incoming packets, wherein said metadata at least comprises information about the appropriate flow processing sequence for the concerned packet(s). Of course information can also be provided for in other ways than through metadata concerning the appropriate flow processing sequence. It has however been found that metadata is an excellent means to use in the concerned context. Particularly the metadata comprises a processing sequence identity and an index marking which is updated or modified, for example stepped up, for each processing step of the sequence that is performed or executed, the purpose thereof being to make it possible to, for a packet or a flow of packets, provide information about where in the processing sequence the packet currently is.

Particularly the internal forwarding means are in communication with, or comprised by, said flows processing core means also comprising the classifying means, and more particularly said internal forwarding means comprise or are in communication with forwarding information holding means. Most particularly said forwarding information holding means comprise internal forwarding tables holding information relating to switching/distribution of packets to units or arrangements supporting sending of packet flow sequence information added to packets. Said flow processing core may additionally comprise external forwarding means and external forwarding information holding means, which is extremely advantageous.

The internal forwarding information holding means, for example internal forwarding tables, particularly comprise logical addresses relating to at least all internal units or processing means and to internal processing units supporting provisioning of packet flow processing sequence information. For other internal units the IP address is used for forwarding (particularly not the logical address). Particularly the external forwarding information holding means comprises logical addresses indicating the addresses to external units or arrangements. In a particular embodiment, when the logical address indicates an external unit, the data packets are sent without flow sequence information and the packets are provided with an indication that they should be returned to the sending arrangement. This can of course also be handled in other manners. Packets received from an external unit are treated as new packets requiring classification or re-classification. I.e., packets from an external unit, indicated by a logical address, are classified, or reclassified using the logical address as additional input for classification.

Particularly one or more of the processing functions or steps of a processing sequence depend on dynamically assigned variables and the core processing means supports or comprises an optional functionality which may consist of binding processing specific variables to the flow sequence information data, e.g. to the metadata if such is used. This particularly enables "one-time classification". Most particularly processing specific variable binding is performed by implementation of filtering values held by, or accessible by, the core processing means, e.g. FPC.

As an example, a processing sequence may include one or more of authorization, policing, charging data related operations, QoS control etc.

Particularly, for packets which cannot be classified into a packet flow with a given processing flow sequence, a temporary default processing flow (particularly requiring re-classification) is allocated until a permanent classification can be performed. Most advantageously the core processing means (or FPC) supports a fast path and a slow path for packet processing. Said fast path is used for already permanently classified packets and the slow path updates the cache when a permanent classification is provided or arrives. This will be more thoroughly explained later in the detached description of the invention. Detecting means are particularly provided for sending packets to the appropriate flow or for sending packets from the fast flow and to the slow flow or vice versa, when required.

Most advantageously the arrangement comprises pre-processing means for analyzing incoming packets, preferably for creating a temporary packet storage, and for identifying and differentiating between internal, capsulated, e.g. tunneled payload packets and non-encapsulated, e.g. un-tunneled packets. It should be clear that tunneling only relates to one implementation.

In a most advantageous implementation Ethernet VLAN tagging is supported, and the packet VLAN tags are analyzed in the pre-processing means for inspection and/or classifying purposes. Particularly, the distribution means, after classification, communicates with distribution means in other arrangements or units if, according to the classification, such other arrangements or units are handling the relevant processing steps to which the packets are forwarded. Particularly packets are sent to other distributing means as encapsulated IP-packets with flow sequence information and an indication, e.g. in the form of metadata.

Most particularly the arrangement comprises means for establishing to which user session received packets belong and for binding them to that user session, for example using an APN/VPN.

In a particular embodiment the flow processing core comprises means for mapping different access links to respective unique logical links, preferably providing for a controllable degree of access link or access technology knowledge or awareness.

Additionally, or alternatively, the arrangement comprises or communicates with means for identifying services with particular IP-addresses, or for determining the service content of the received packets. Hence, it is possible, according to the inventive concept, to perform the assignment of flow sequences and distribution, and to do that by using information about different factors such as user and/or access type and/or service type.

In a particularly advantageous embodiment the arrangement is comprised in a GGSN (Gateway GPRS Support Node) or a CGSN (Combined GPRS Support Node) or any other packet data node with a similar functionality. It may also be implemented as a stand-alone unit which however should be in communication with a GGSN or a CGSN or similar.

One or more of the objects referred to may particularly be met by a GGSN or a CGSN comprising an arrangement having one or more of the features as discussed above.

The invention also suggests a system comprising a number of arrangements, nodes or sites as discussed above wherein the or a number of arrangements comprise one or more of the above mentioned features and through which one or more of the initially discussed objects can be met.

Particularly packets are encapsulated and metadata information is added as metadata headers for sending between arrangements supporting the same forwarding protocol, particularly between internal forwarding means of different arrangements or units, and within arrangements, whereas packets forwarded by external forwarding means are sent as non-encapsulated packets, particularly as standard IP-packets.

The invention also suggests a method for handling switching of data packets or flows of data packets in a communication system supporting communication of packet data, to functional or processing units or arrangements for performing operations on the data packets. The method comprises the steps of; inspecting a packet received in an arrangement over an interface to an access network, which for example may be Ethernet, by examining at least identity information, packet type, origin and destination information; establishing if, for the packet, a processing flow sequence already is available, for example in temporary flow sequence information holding means such as a cache or similar, and, if yes, associating the packet with the applicable flow sequence and the relevant processing step of the flow sequence; updating the temporary flow information holding means, and forwarding the packet to the relevant processing unit or arrangement in the flow sequence, and, if not, classifying the packet particularly by using information about one or more of type of access, user, type of service, hence, assigning a packet flow sequence comprising a relevant applicable processing step sequence if an applicable policy is available, otherwise, temporary or default classifying the packet and; forwarding the packet to the relevant processing unit or arrangement.

It should be clear that a packet can be classified using information about destination, origin, port number etc. Particularly the method comprises the step of; adding metadata information containing flow processing sequence information and an indication relating to processing step in the sequence, for example current/preceding/subsequent step, such that the packet, at reception in another processing unit or arrangement supporting the same internal forwarding protocol can be appropriately forwarded without classification, hence avoiding re-classification. Particularly VLAN tagging is supported and the method preferably comprises the step of; using and examining the VLAN tag at least for inspection purposes.

According to the invention IP flows can be switched through a plurality of processing functions in an efficient manner and functions or processing steps can be by-passed if they are not relevant necessary for the particular flow. Preferably this can be satisfied also using completely open interfaces to the units performing the actual pay-load processing, which considerably simplifies interworking with different kinds of equipment, e.g. sourced equipment etc. that does not provide any protocol support in addition to the standard TCP/IP and for example Ethernet protocols. Particularly, according to the invention, unnecessary re-inspection and/or classification of packets can be avoided. This is extremely advantageous since inspections and classifications are time-consuming as well as costly. Particularly a one-time inspection or classification is provided for, at least as far as this is possible, and switching is made consistent which means that a processing sequence actually can be determined and withheld. To enable a so called one-time classification processing variable binding in FPC is needed; otherwise a new classification or inspection will be needed.

As referred to above, the relevant or applicable processing sequences to be applied to specific flows may advantageously be based on different factors, for example service types, access types and user etc. (processing variable binding).

The present invention particularly suggests a distributed system where different functions can be applied in different flows and in which classification of packets or flows of packets does not have to be repeated more than absolutely necessary. Generally, as referred to above, this is achieved through determining the processing sequence, particularly providing a permanent classification of flows and optionally binding necessary variables to the respective flows to specify the flow sequence with due regard to said variables, and by switching the flows accordingly between different processing functions.

Hence, optionally or advantageously the decision as far as the applicable flows are concerned, during classification and in order to determine a processing sequence applicable for the flow, to avoid re-classification, is based on several factors such as for example service type, access type and user, which are specified by variables bound to the flows as referred to above.

In a particularly advantageous embodiment external functions can be added to the chain of processing of the IP flows, without being required to support a specific or proprietary format for forwarding of IP packets, but merely being required to support IP, Ethernet and VLAN tagging of Ethernet frames (or correspondingly).

Hence, according to the invention processing is controlled by processing sequences and indexes. Furthermore, distributed switching is enabled and most preferably processing sequence information and position index is supplied and "adhered" to packets as metadata information and forwarding tables are particularly distributed in/throughout arrangements supporting the functionality as claimed herein.

It is an advantage of the invention that re-classification to a large extent can be avoided through binding or associating a processing sequence and index information and particularly or optionally also processing variables to the packets. In a particularly advantageous embodiments VLAN tagging is used to correctly maintain the order of processing functions to be applied on a flow without the need for keeping any packet state for that purpose.

BRIEF DESCRIPTION OF THE DRAWINGS

The invention will in the following be further described, in a non-limiting manner, and with reference to the accompanying drawings in which.

DETAILED DESCRIPTION OF THE INVENTION

Figure 1:
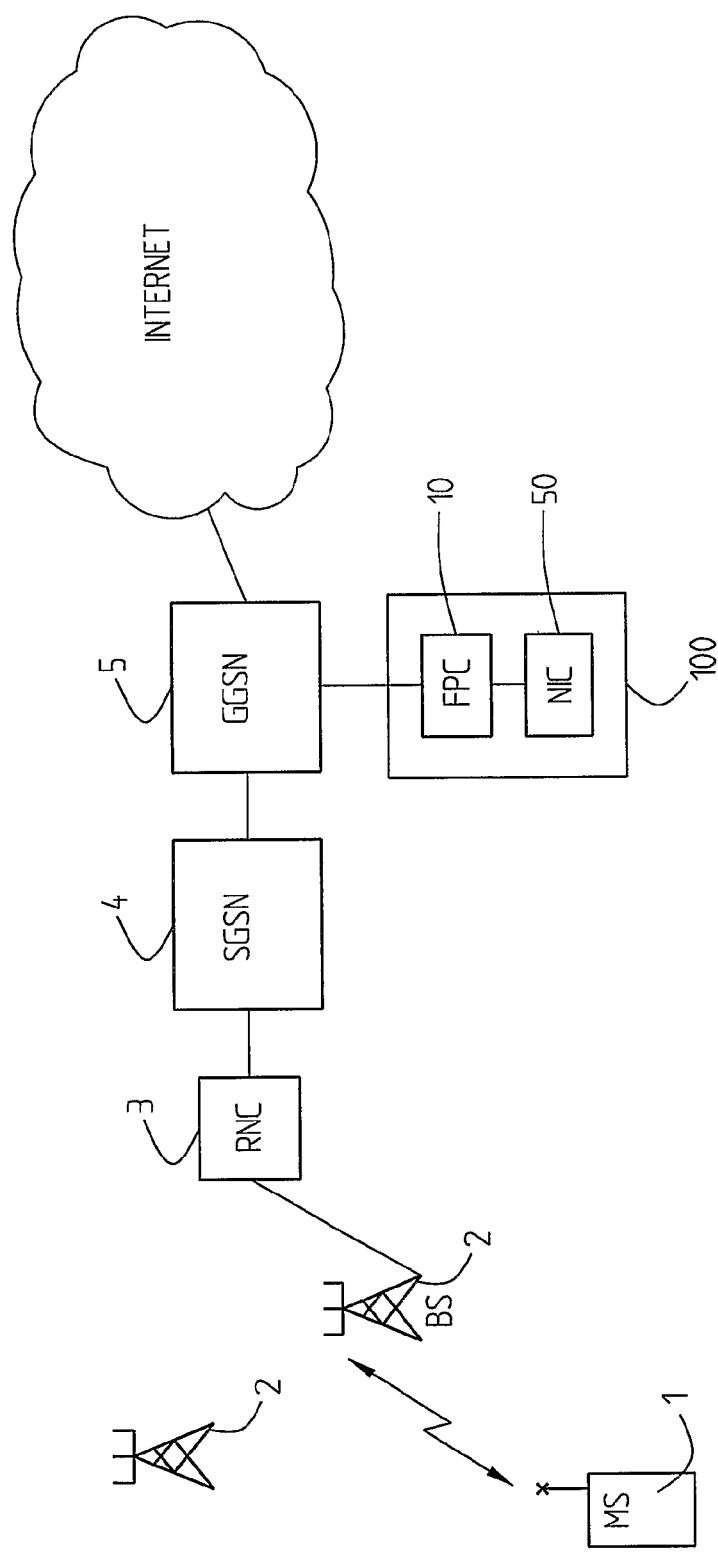
FIG. 1 very schematically illustrates a communication system with an arrangement according to the present invention provided in a GGSN.

FIG. 1 is a very schematical illustration of a communication system in which an arrangement for handling switching of data packets or flows of data packets according to the present invention can be implemented, or more particularly a system comprising a number of such arrangements (however only one shown in the Figure for reasons of clarity). In this particular embodiment it is supposed that it is a communication system supporting communication of packet data, e.g. GPRS (GSM Packet Radio Service) or UMTS (Universal Mobile Telecommunications System). In the Figure is shown a mobile station MS 1 communicating with a base station BS 2 over an RNC 3 (Radio Network Controller) which communicates with a Serving GPRS Support Node SGSN 4. SGSN keeps track of the locations of individual MSs, performs security functions and access control etc. in a conventional manner. SGSN 4 in turn is connected to a network node gateway, GGSN 5 (GPRS Gateway Support Node), which provides for interworking with the external packet switched networks and it is connected to a number of SGSNs via an IP (Internet Protocol) based backbone network. The functionalities of SGSN and GGSN may be provided at different sites or in different nodes, but they may also be combined in one and the same physical node or at a site and e.g. constitute a so called CGSN (Combined GPRS Support Node) which provides both the functionalities of an SGSN and a GGSN. The CGSN then forms a gateway to external data networks such as Internet.

The arrangement 100 for handling switching of data packets or flows of data packets according to the present invention here is supposed to be a standalone arrangement associated with, or in communication with GGSN 5. It should be clear that alternatively it could be provided in GGSN or in the same node, or at the same site, or it could somehow be in communication with or associated with a CGSN or any other node with a similar functionality. In this figure arrangement 100 is merely very schematically illustrated and it will be more thoroughly explained below. It comprises a flow processing core FPC 10 handling among others classification of packets and appropriate distribution or switching of packets or packet flows for processing. Optionally it is in communication with (or comprises) a Network Information Controller NIC 50 which handles and collects information about one or more of user, access types or access characteristics, service types and other contexts in order to enable binding of processing variables, to be used for classification purposes, which however is an optional but advantageous feature which will be explained more carefully below the in the document.

Figure 2:
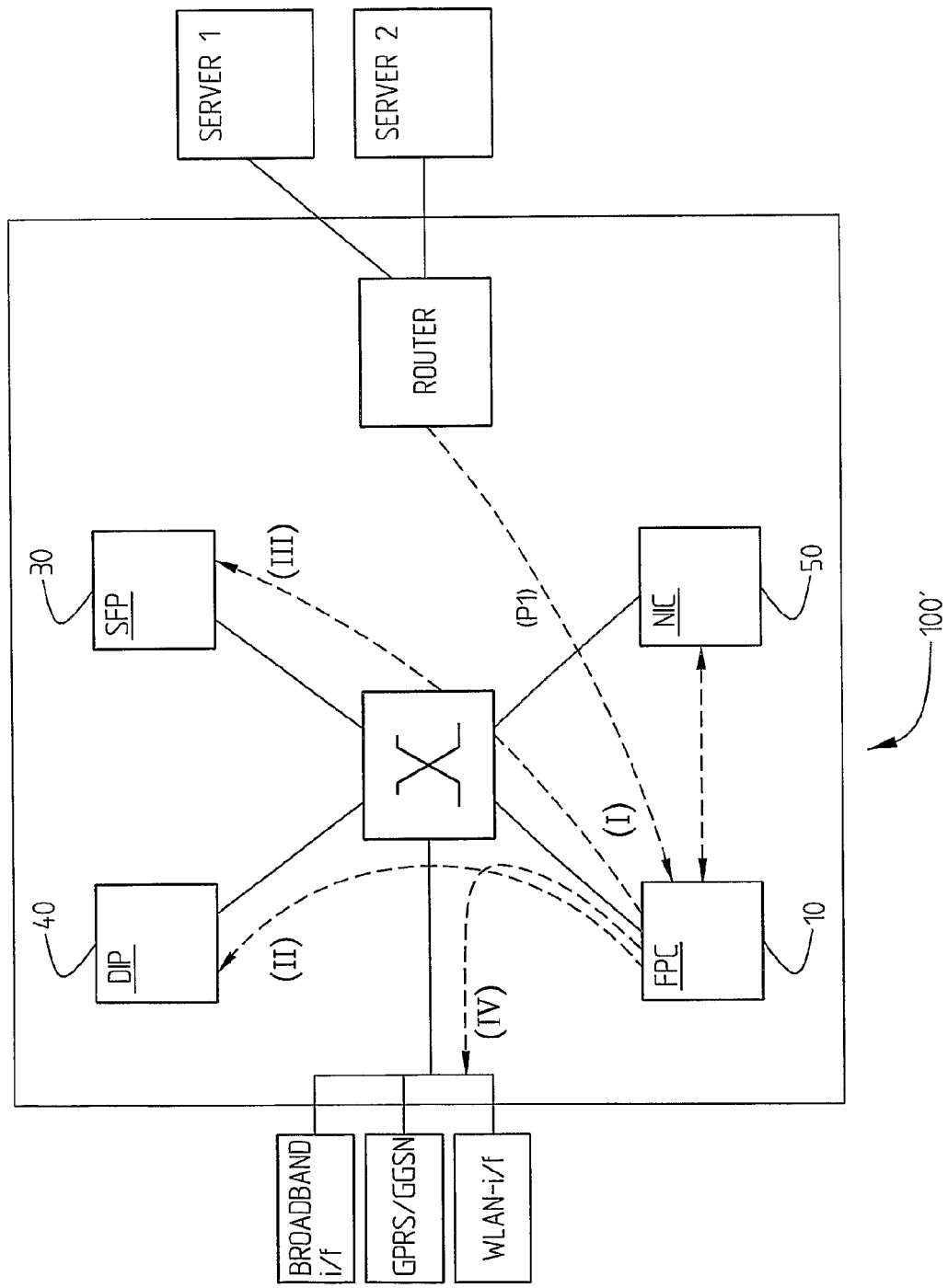
FIG. 2 is a schematical overview of an arrangement according to present invention in its context, FIG. 3 schematically illustrates the functioning of an arrangement according to the invention.

FIG. 2 shows an arrangement 100' according to the inventive concept according to one specific embodiment. This figure is merely intended to give an overview of an arrangement which includes the optional feature of providing/binding/ information relating to user, service type, access type etc. as briefly mentioned above.

The arrangement 100' comprises a Flow Processing Core FPC 10 which is the main entity for handling classification and switching of flows. A main purpose of FPC 10 is to provide a "one time", permanent classification for flows of packets and, in a particularly advantageous embodiment to which the invention however not is limited, bind variables needed for other processing functions, and switch the flows between procession functions. The basic function of the FPC 10 is to identify processing sequences for received packets. Hence, the FPC 10 inspects and classifies received packets, (I), which are received via a router from external servers, e.g. server 1 or server 2. It particularly determines the processing sequence that is to be applied to a particular packet or to the flow to which it belongs, and distributes packets to other units that operate on the packet flow. FPC 10 thus establishes the processing sequence and, once the packets are classified, provides for forwarding of the packets accordingly, i.e. to follow the sequence as will be thoroughly explained below. In this embodiment it is supposed that further a Deep Inspection and Processing unit DIP 40 and a Special Flow Processing unit SFP 30 are provided. It should be clear that these units are not necessary for the functioning of the present invention. However, in the illustrated embodiment the units FPC 10, NIC 50, SFP 30, DIP 40 communicate over a switching arrangement, for example an Ethernet switch or a so called Rapid I/O switch or any other similar switching arrangement. Hence, (here) an Ethernet packet is first routed to FPC 10 (I) which provides for inspection and flow detection and classification. It actually forms an external to internal zone interface and it may handle policy enforcement (sequence) for flows and comprise the forwarding functionality. If it for example is established that a deep inspection is needed, the packet may be forwarded by FPC 10 to DIP 40 (II) through the switch. DIP 40 is a unit that may handle stateful TCP (Transmission Control Protocol) and HTTP (Hypertext Transfer Protocol) inspections, URL-based (Uniform Resource Locator) authorization and redirection, separation into streams or treatment policy enforcement for streams etc. It should be clear that it may comprise one or more of these functionalities, other functionalities or other functionalities in addition thereto etc. If this step is performed, the packet is returned, via the switch to FPC 10 which, if relevant, forwards the packet to the unit Special Flow Processing SFP 30 which for example handles processing of selected flows. It may constitute a charging collection point and handle policing, comprise terminal connection etc. whereafter the packet is returned to the FPC 10. FPC 10 then switches the packet (IV) to a WLAN (Wireless Local Area Network) access node, to a GGSN of GPRS or to a broadband access interface etc.

Although it is merely illustrated in the figure (for reasons of clarity) that data traffic goes from a server to a client, it should be clear that it also goes from a client to a server. Packets are handled in a similar way irrespectively of whether they arrive from a user in the access network or from a server.

Hence, FPC 10 establishes after inspection of a packet, if possible, a relevant processing flow sequence i.e. the units, internal or external, to which the packet is to be sent for processing and in which order it is to be handled by the respective units. This is determined by the processing sequence information which is added to the packet, and preferably an indication marking indicating the current (or preceding or subsequent) step in the processing chain, for example indicating where the packet currently is or is processed. Upon reception of the packet, FPC 10 performs an inspection and a classification and adds information to the packet as to the relevant processing flow sequence and the current location of the packet in said flow sequence. Particularly additional data may also be sent along with the packet, most advantageously as additional metadata information.

In an advantageous implementation the (basic) metadata information includes processing sequence and a processing index. In a particularly advantageous implementation it may also comprise other processing variables, although the inventive concept is not limited thereto. This will be further described below. It is then supposed that the packet is received in another unit, which here is supposed to be another arrangement or unit supporting the inventive concept and thus supports the protocol format with the sending of metadata information as explained above. The received data gives the further processing and hence the receiving unit does not have to re-classify the packet. If however, this subsequent receiving unit is an external unit, i.e. an arrangement or a unit not supporting the protocol for example including metadata information, an un-marked, or correspondingly marked, packet is sent. The external unit or arrangement will then, after appropriately processing the packet, return the packet to the FPC of the preceding step, or to the preceding arrangement, which then has to re-classify the packet, since there is no metadata. This will be more thoroughly described below.

Actually the Flow Processing Core 10 may, in addition to inspection, classification and switching, implement one or more processing functions itself, which here means functions that process the actual payload. Examples of such functions are NAPT (Network Address Port Translation) and firewall functionalities, handling of where packets are to be sent using ARP (Address Registration Protocol), handling of control messages using ICMP (Internet Control Message Protocol) etc. It should however be clear that these functions merely are given for exemplifying reasons.

FCP 10 is furthermore inherently stateless, i.e. no persistent state is needed to guide the switching of a flow but all information that is needed is preferably derived through processing rules and by sending information, particularly metadata information.

Figure 3:
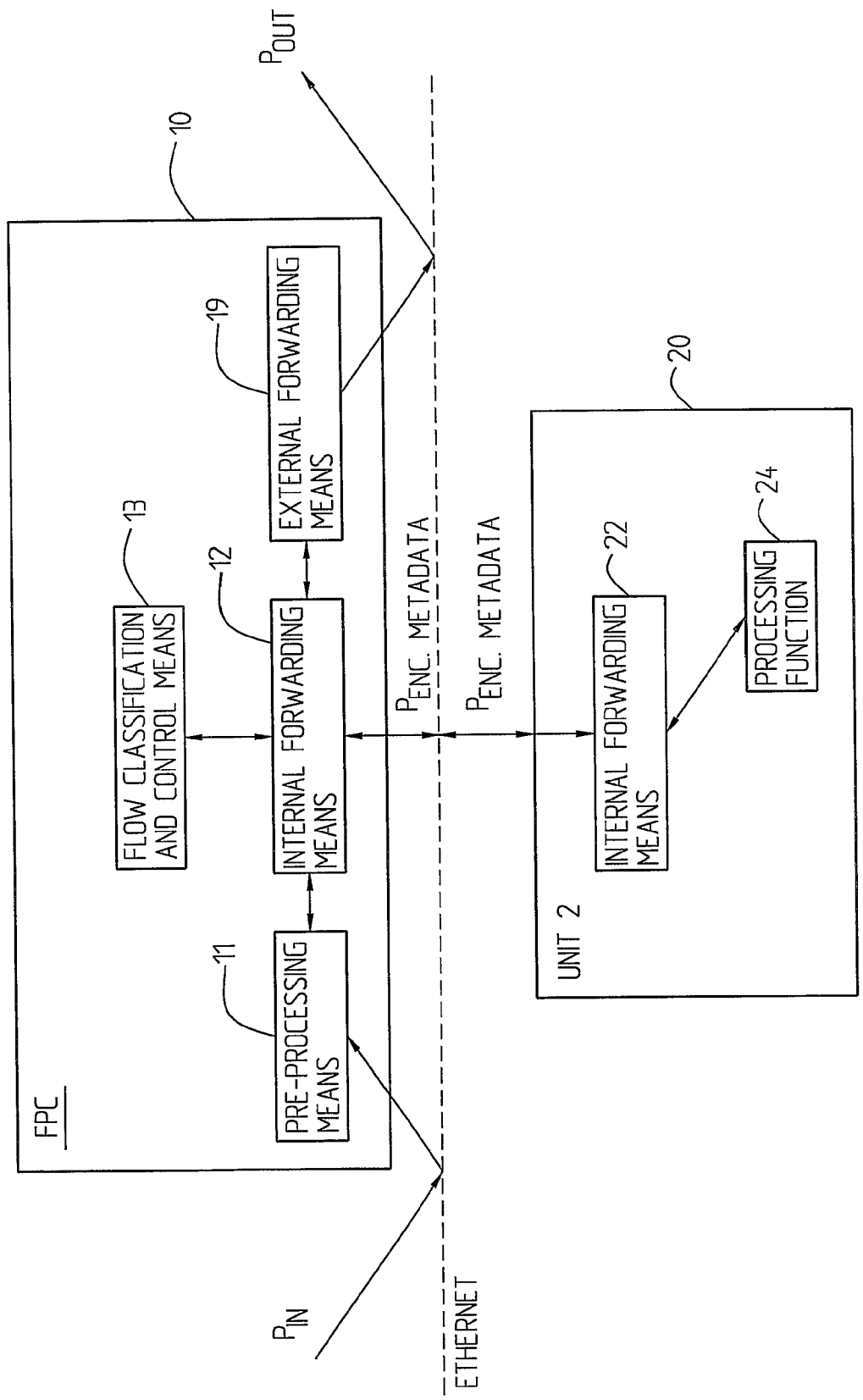

FIG. 3 very schematically illustrates the handling of incoming traffic $P_{in}$ in an FPC 10 whereby one of the first processing steps is handled in another unit 20 which however supports the functionality according to the present invention. Thus, it is here supposed that the FCP 10 comprises pre-processing means 11 which briefly can be said to perform an inspection of the packet to see if it has been classified and if it belongs to a flow with a defined processing sequence, internal forwarding means 12 which handles forwarding to other internal forwarding means, cf. internal forwarding means 22 of another unit 20 supporting the inventive functionality and to other internal units such as for example processing means within the FPC 10 itself (not shown) or to, if the packet requires classification, flow classification and control means 13. It also forwards the packet to external forwarding means 19 and this is applicable, for example when a packet has been processed according to the relevant processing sequence and is to be output or when it is to be processed by an external unit not supporting switching of data packets according to the invention, i.e. which do not support the internal protocol, for example including sending of at least basic metadata information.

Hence, it is supposed that the internal forwarding function 12 operates based on forwarding tables (not shown in the figure). When the flow FPC 10 detects a flow, a decision has to be taken on which processing sequence that is relevant. If available, i.e. if the incoming packet can be mapped to some information held in the internal forwarding tables, the packet can be mapped against a processing sequence and FPC may then assign, during classification and possibly rule evaluation if provision policies are taken into account, a processing sequence ID in the form of metadata information. If such a processing sequence, for example based on provision policies, is available, the processing sequence will be marked as permanent. If, on the other hand, FPC does not find any applicable flow sequence or policy, a default policy that is not permanent may be applied. Hence the packet may be marked with a default processing sequence identity corresponding to such a default policy. Advantageously, the default policy or the default processing sequence identity is, at a later stage, replaced with a permanent processing sequence identity when such can be established. A request may for example be sent to get a permanent processing sequence identity corresponding to a permanent policy decision. A request therefore may for example be sent to (cf. FIG. 2) NIC 50 or some other external entity. When a permanent decision response is received, all consecutive packets of the same flow will be marked with the permanent processing sequence identity information.

In FIG. 3 it is supposed that a packet arrives as a raw packet over for example Ethernet to FPC 10. The packet is first handled in the pre-processor means 11 which, in a particularly advantageous embodiment, extracts and analyzes the VLAN tag (Virtual Local Area Network) of the received packet which is used to determine the direction of a packet and to differentiate between virtual or logical networks etc. After pre-processing in pre-processor means 11, the packet is internally forwarded, via internal forwarding means 12, to flow classification and control means 13, where the packet is classified and the treatment that should be applied to the packet, e.g. the relevant flow processing sequence, is determined. The internal forwarding means 12 then, after receiving the classified packet from the flow classification and control means 13, forwards the packet to the relevant processing arrangements or units according to the relevant flow sequence.

There may for example be any number of processing functions forming a sequence and, as referred to above, the relevant processing sequence applicable for the packet is identified through a processing sequence identifier and a processing index is preferably kept in order to keep track of which processing step that actually is handled, just has been handled or to be performed next. The relevant processing functions may be distributed and the internal forwarding means 12 may forward the packet to another internal forwarding means 22 in another hardware unit 20. The packet is then encapsulated and metadata headers are added to control the processing, hence comprising information about the relevant processing sequence and the index, for example indicating current processing. The internal forwarding means 22 of the other unit 20 hence forwards the packet to the relevant processing function 24, and when the processing has been terminated, returns the packet to the internal forwarding means 22, the index is stepped up, and the internal forwarding means 22 returns the packet to the relevant subsequent unit of the applicable processing sequence. However, as processing is terminated, the packet is sent to the external forwarder 19 to be sent out again, using standard IP (not encapsulated) communication. The packet could also have been provided to external forwarding means (if any) in said other unit 20. The external forwarding means 19 particularly operates using a forwarding table which controls the outgoing routes, including which VLAN tag to apply to the outgoing packet.

It should be clear that individual processing and functions often depend on dynamically or assigned variables that only can be bound through inspection or classification. A charging data collection function may for example need a charging key bound to the flow. In order to avoid a situation where the charging data collection function has to perform a full inspection or classification, the FPC 10 may, in an advantageous embodiment, perform such variable binding. In such embodiments, the FPC may, during classification, bind any process and specific variables. These bindings are defined through filtering and rules on which the FPC operates. When a variable has been bound, it will be sent along with the packet as additional metadata and a processing function may extract the variable from the metadata, eliminating the need for inspection or classification, which is extremely advantageous.

Figure 4:
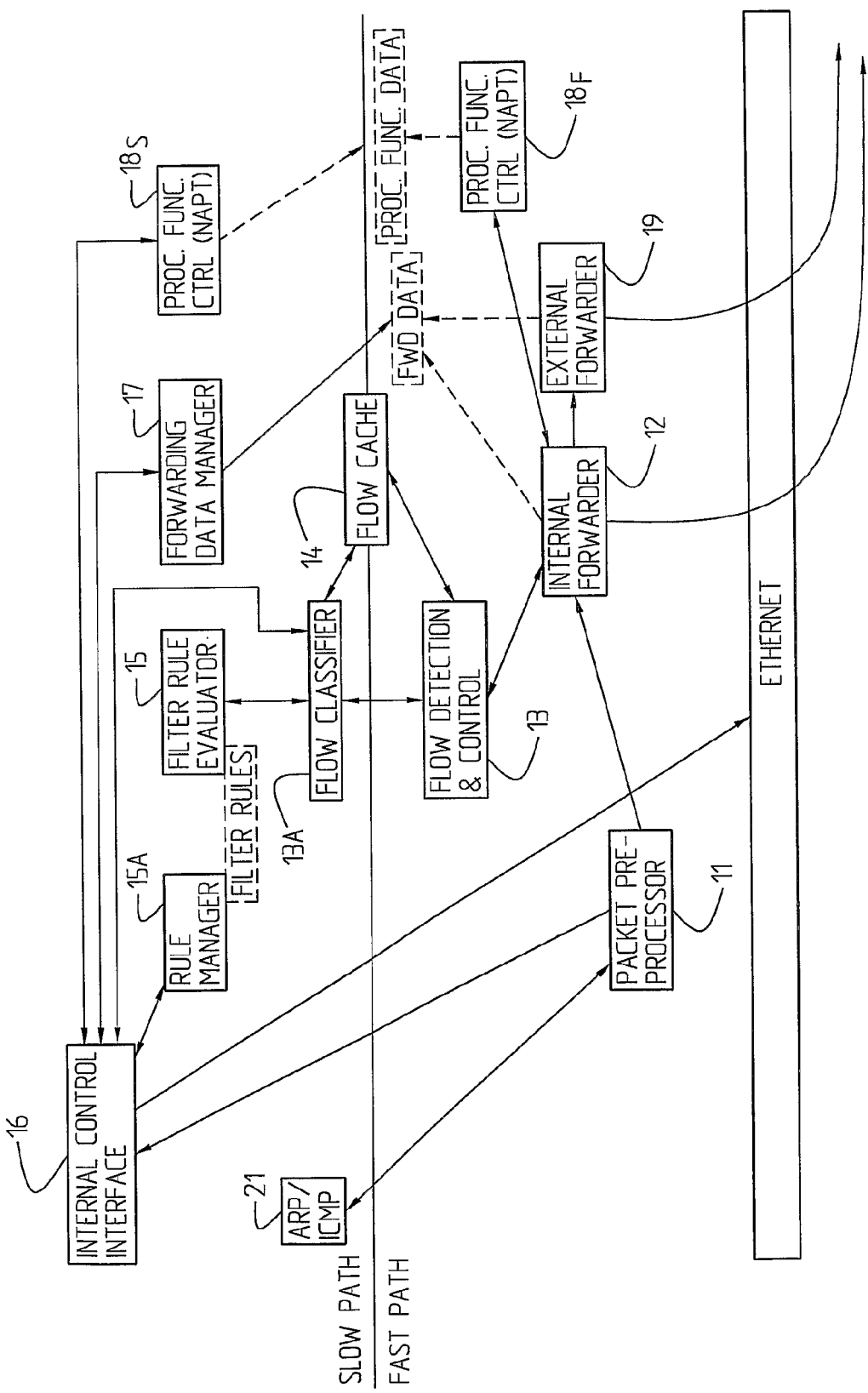
FIG. 4 illustrates a flow processing core (FPC) according to one embodiment of the present invention.

FIG. 4 is a functional, schematical overview of an implementation of the FPC 10. As referred to above, most preferably the FPC is capable of providing a permanent or one time classification of packets or packet flows and, in an even more particular implementation, FPC 10 is capable of binding variables needed for other processing functions, and it provides for switching between the different processing steps, i.e. the relevant functions or arrangements performing the relevant processing steps according to the flow sequence as classified for a packet. In a most advantageous implementation of an FPC, it is functionally split between a fast path and a slow path, as can be seen in FIG. 4. The major part of the packet forwarding and processing relating thereto is handled in the fast path. The slow path, in this particular implementation, handles classification of packets or flows that are newly detected, i.e. when no flow sequence can be identified for a packet, and which therefore requires a more advanced processing and/or decision making. The handling in the fast path will be more thoroughly described with reference to FIG. 5 below.

The fast path here comprises a packet pre-processor 11, an internal forwarder 12 and an external forwarder 19 as discussed above, a flow detection and control means 13, a flow cache 14, which is used both by the flow detection and control means 13 of the fast path and by the flow classifying means 13A of the slow path and, for example a processing functional means e.g. for NAPT (Network Address Port Translation) traffic, 18. Particularly the slow path component or components implement the control communication of the flow processing core with the optional NIC controller 50 (see FIG. 2) and data management functions by means of internal control interface 16.

Hence, when a packet arrives for which no flow sequence can be identified, it is from packet pre-processor 11 via internal forwarder 12 and flow detection and control means 13 transferred to the flow classifier 13A of the slow path which performs a classification among others using a filter rule evaluating means 15 using filter rules and which are managed by rule manager 15A. FPC does not keep any user data except for what is stored in the flow cache 14 which is shared between the slow path and the fast path. Filter rules which for example are user specific and user specific state are kept by the individual processing functions. This means that the FPC only needs limited capabilities in terms of decision making or policy decisions while the internal control interface 16, which comprises a control communication interface, is provided at least if the processing is based on information about user and/or access type and/or service and/or other contexts that may be applicable. Preferably the fast and the slow paths communicate by means of a communication between the shared cache 14 and signaling. Several components (not shown) are involved in the decision making as to which processing sequence that should be applied to a flow, as determined in the slow path, e.g. service type, access type, user etc. Generally, for forwarding within an arrangement or in-between arrangements supporting the inventive functionality, an internal forwarding protocol is used which is supposed to be a protocol where the original packets are encapsulated and additional information relating to at least applicable flow sequence and status or position indication is sent along with the original packet, preferably as metadata whereas un-tunneled IP packets are used for external communication, i.e. with units or arrangements not supporting the internal forwarding protocol.

It should be clear that the fast path (as well as the slow path) contains a number cooperating functional modules with a functional split that allows reuse, i.e. some modules can be reused in other entities than an FPC, e.g. the pre-processor.

Figure 5:
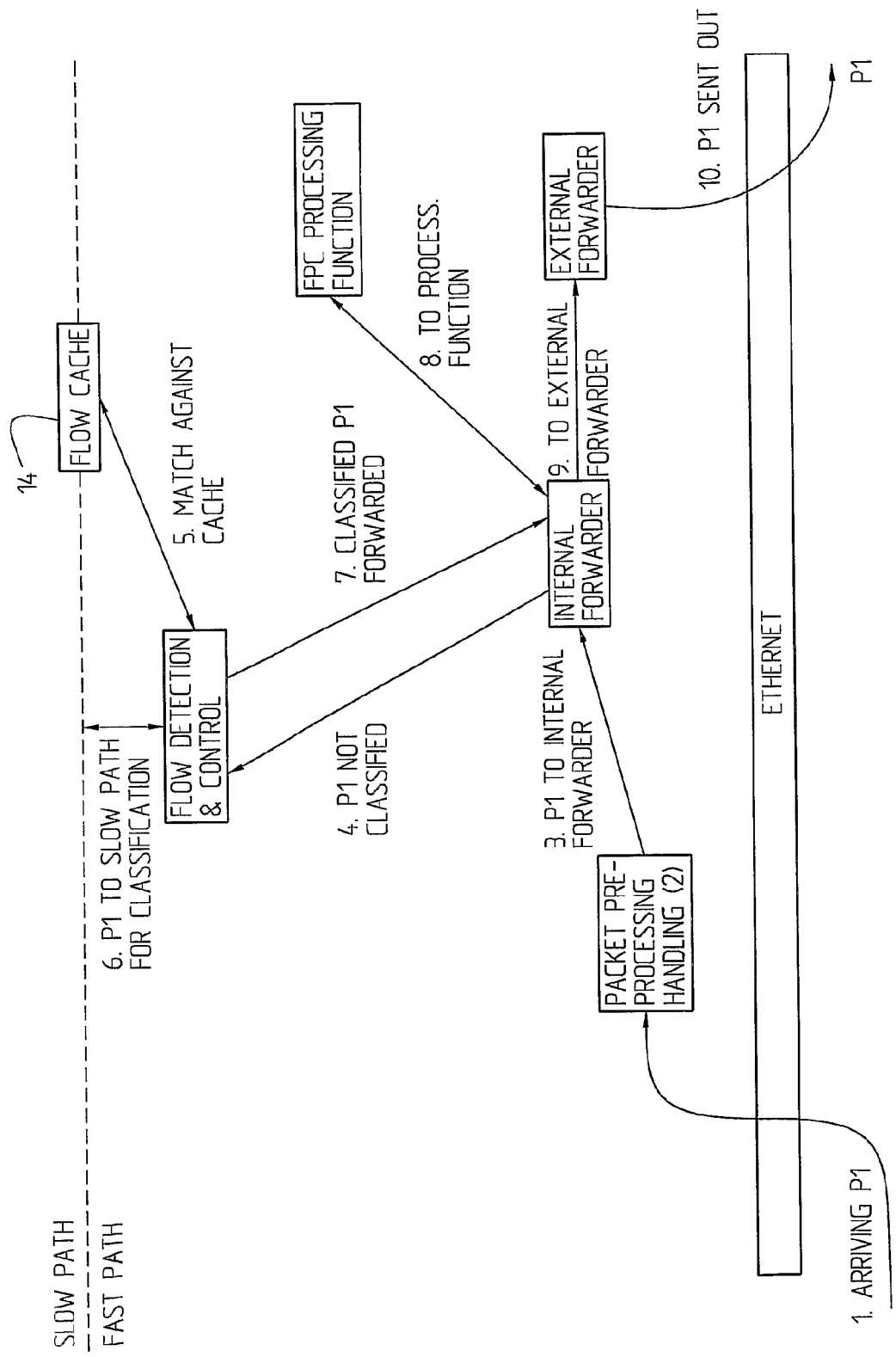
FIG. 5 illustrates the procedure for a packet arriving to an arrangement according to the present invention, which packet is permanently classified and follows the so called fast path.

With reference to FIG. 5 the handling in the fast path of an arriving packet will be more thoroughly explained. Hence, it is supposed that a packet P1 arrives at packet pre-processing means 1, over for example an Ethernet interface. The received packet is handled by the pre-processing means which, after inspection of the packet here including identifying it as a payload packet, and preparing it for further processing. In this embodiment it includes extracting all necessary fields from the packet header (an example of a packet will be shown with reference to FIG. 8 below), e.g. TCP/IP 5-tuple and VLAN tag on condition that VLAN tagging is supported, 2. Since the packet, in this case, has not been classified before, it will be sent to the flow detection and control module, 4, where it is matched against the content in the sequence information holding means, e.g. flow cache, 5. If the flow cannot be found, the flow detection and control module will communicate with the slow path, 6, in order to have the packet classified. There (cf. FIG. 4) a sequence is determined and a cache entry in the shared flow cache is created. Then, the flow detection and control module, after receiving a response from the slow path, will create the necessary internal data structures so that internal forwarding can be initiated, 7, comprising setting processing sequence and index which are added to the packet, and based on the said processing sequence and index, the internal forwarding means will send or forward the packet accordingly. The packet may for example be forwarded to a local processing function, 8, based on the location area where it is registered, to some other unit through internal forwarding e.g. using metadata tunnels in TLV (Type, Length, Value) format or through external forwarding, 9, which however merely constitute some examples.

Particularly the fast path supports the Ethernet MAC layer. Preferably it supports IP integrity checks and ARP (Address Resolution Protocol) cache lookups etc. Preferably it also supports triggering of ARP lookup messages in case there is no entry in the cache.

In the following the means of the fast path will be described somewhat more thoroughly.

The packet pre-processing means 11, cf. FIG. 4, comprises a module which preferably creates a packet temporary storage, identifies control signaling based on information in the traffic mapping table and handles or initiates forwarding to the slow path when this is required, i.e. when there is no information in the flow cache for the relevant packet flow. Further the packet pre-processing means is capable of identifying encapsulated (internally tunneled) payload packets and sending such packets to the internal forwarding means which is responsible for extracting the tunnel metadata headers containing the information relevant for the flow sequence that is applicable and the position in the flow, in which case the packet need not be forwarded to the slow path.

The packet pre-processing means also identifies non-encapsulated e.g. ("un-tunneled") payload packets which have to be sent for classification via the flow detection and control entity which cooperates with the slow path. Such un-tunneled payload packets may be sent directly from the packet pre-processing means to the flow detection and control module or via the internal forwarding means according to different implementations. In a particular implementation the packet pre-processing means also comprises a functionality for extracting packet header elements that are required for classification. The packet pre-processing means may also contain one or more additional functionalities, such as for example identification of control signaling based on information in the traffic mapping table for forwarding to the slow path, identification of ARP/ICMP directed to the or a FPC as a host and for forwarding to the ARP/ICMP module in the slow path.

The internal forwarding means 12, cf. FIG. 4, particularly comprises a module for forwarding packets according to defined processing sequences (or in order to obtain such processing sequence for a packet). Units or arrangements, particularly modules, capable of processing flows such as processing functions or units or arrangements, or external forwarding means, will register with the internal forwarding means and provide information about which logical addresses they serve.

In one embodiment, the internal forwarding means 12 require two information elements in order to be able to forward a packet, namely the processing sequence ID and the processing index as discussed above. The processing sequence identity uniquely identifies the sequence of the processing steps that packets of that particular flow have to go through. The index indicates the current position in the concerned processing sequence. The index (if such is used) is stepped up for each processing step.

Figure 6:
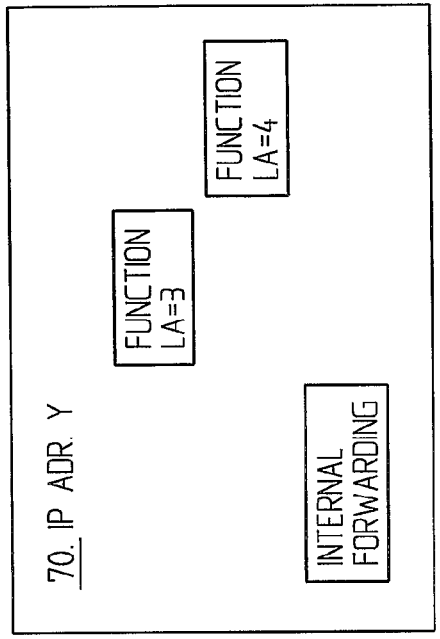
FIG. 6 illustrates an example on forwarding tables that can be provided in or in association with an arrangement according to the present invention, FIG. 7 schematically illustrates the internal control interface of the slow path of FIG. 4.
Figure 6:
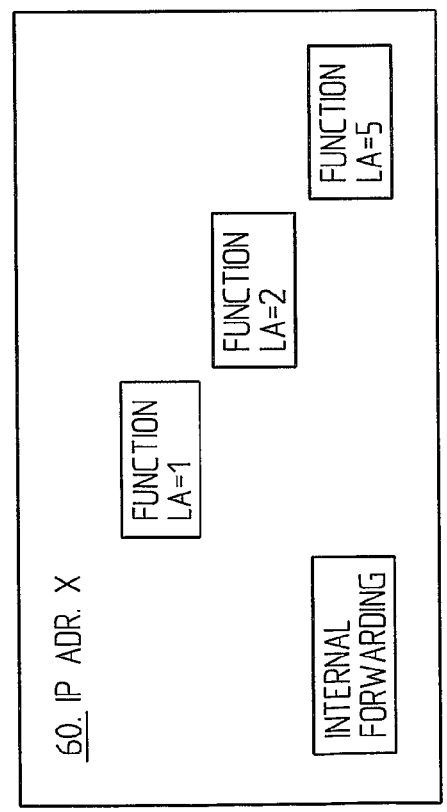

The processing sequence identity is attached to the packet based on inspection/classification and it may be performed in the packet pre-processing means or in the flow detection and control means. When a packet arrives, the internal forwarding means 12 will check the processing sequence identity and the processing index, which are stored in the temporary packet storage, against the internal forwarding table which particularly has been provisioned via signaling through the slow path from the NIC as discussed above, if implemented. FIG. 6 below illustrates examples on forwarding tables, If the forwarding decision indicates that a processing function that has registered with a particular logical address, is to be called, the packet and the control thereof is handled over to the module that registered with that logical address (if no such logical address can be found, an error has occurred).

A forwarding table may also indicate that a packet should be internally forwarded to another unit or arrangement with a particular IP address. The internal forwarding means will then encapsulate the packet, e.g. create the internal tunnel packet comprising tunnel header and payload, cf. FIG. 8, and send the packet to the specified IP address, e.g. using the MAC address found through ARP. The internal tunnel format may comprise a TLV-based scheme, i.e. comprising type, length, value information. Hence, the internal forwarding means needs to know, if the processing sequence and the index are known, whether to send the packet to a processing function locally, in which case it has to know the logical address of the next processing step or function in the sequence, or whether it should forward the packet to some other entity, for example the deep inspection unit, e.g. DIP 40 of FIG. 2. In the latter case the internal forwarding means needs to know the IP address of that entity.

In FIG. 6 two hardware units are illustrated the first of which 60 having the IP address X and the second 70 having the IP address Y. The first unit 60 comprises an internal forwarding means which communicates with an internal forwarding table and comprises functions with logical addresses LA=1, LA=2, LA=5 whereas the second hardware unit comprises internal forwarding means in communication with an internal forwarding table and further comprising a function with a logical address LA=3, and a function with logical address LA=4. In the internal forwarding tables sequences A, B are contained, wherein sequence A is given by functions 1, 2, 3, 4 whereas sequence B is given by functions 4, 1, 5. The respective internal forwarding tables also contain indices indicating the position in the processing flow that currently is handling the packet.

Some of the logical addresses LA may correspond to external entities which means that the packet is to be sent to a router, i.e. leave the system, or to some node with which interworking takes place. In that case the processing entity performs an external forwarding operation, cf. FIG. 5 as discussed above and FIG. 9 below. In one embodiment the respective processing arrangements also comprise some kind of external forwarding tables. In the embodiment schematically illustrated in FIG. 6, it is supposed that logical addresses 4 and 5 are external forwarding means, i.e. meaning that a packet is to leave the system. Internal forwarding means also handles extracting data from received, encapsulated, e.g. tunneled packets, storing such data in internal temporary packet storages or similar for further processing. Still further it is responsible for load balancing. Preferably the internal forwarding means comprises a reusable component that can be reused in other components and hence not only in a FPC but also in other processing units or means e.g. in an NIC (cf. FIG. 2); in general any means performing a function within the concept of the present invention.

The flow detection and control means 13, cf. FIG. 4, particularly comprises a module for identification of the flow to which a packet belongs, i.e. it particularly binds the packets to respective flow cache entries where all the data associated with the flow are stored and which, for example, may comprise data variables that are to be sent with each packet of the flow for internal forwarding if such a binding feature is included in the embodiment.

When a new packet arrives in the flow detection and control means, 13 it will check in the flow cache to see if the flow has already been detected. If yes, it will update the temporary packet storage and, if applicable, the necessary data variables, to put the packet into the appropriate flow context. Preferably the processing index is set to an initial value, which is determined by the cache, typically 1, but of course also other indexing methods or indication methods may be used, the main thing being that it somehow can be provided information about where in the processing sequence a packet actually is being handled or to be handled etc. When this has been done, the packet is sent to the internal forwarding means. If no cache entry could be found, the flow detection and control means will interact with the slow path, cf. FIG. 4, in order to have a cache entry created and a processing sequence defined that can be used for the flow, it may also be a default flow.

The flow detection and control means are preferably only used within the FPC, since the FPC is intended to be the point where packet inspection is done in order to identify the flow to which a packet belongs. It should however be clear that in other embodiments the flow detection and control function might be included in other units as well if these e.g. are specified to perform a limited number only of the FPC functions.

The flow cache 14, see FIG. 4, is used to keep cached information about active flows. New entries can be added and old entries can be deleted. Incoming packets are matched against the content of the cache. If for an incoming packet a cache entry exists, that entry is used, otherwise the packet is forwarded to the slow path for classification. New entries are always created and old entries are always deleted by the slow path. The fast path will use the flow cache 14 to find data about a flow, i.e. to associate a packet with a flow. The flow cache 14 is hence shared between the fast and the slow path and it contains all information needed to forward packets belonging to a corresponding flow, i.e. the flow processing sequence, index and, depending on implementation, possibly bound variables which for example may be application specific.

The external forwarder means 19 (cf. FIG. 4) is responsible for forwarding packets that are to be sent out without being encapsulated, e.g. which are not in the internal tunneling format, particularly raw IP packets. According to the invention external functions can, in particular embodiments, be added to the chain of the IP flow processing flow sequence without being required to support any specific or proprietary formats for forwarding of IP packets other than the Internet Protocol IP, Ethernet and VLAN tagging of Ethernet frames. Such an implementation will be more thoroughly described below with reference to FIG. 9. It should also be clear that it does not have to be the Ethernet standard that is implemented but any other similar standard may also be used, for example Rapid In/Out etc.

Also with reference to FIG. 4, the components or the means of the slow path will be briefly discussed. Some of the modules of the slow path interact with the fast path only by supplying data tables on which the fast path shall operate, which are stored in a shared memory, flow cache 14. Particularly this also includes sending of relevant pointers in order to enable for the fast path to access the data area. Other functions have a more direct communication interface where data is passed or transferred between the fast and the slow path respectively. All internal control communication to and from the (optional) NIC 50 control means (cf. FIG. 2) passes through the fast path. The internal control interface 16 operates as a common point for this interaction, i.e. it operates as a dispatcher of control messages, performs parsing, formatting etc.

The flow classifier 13A means, cf. FIG. 4 in an advantageous implementation, is responsible for classifying the flow, and binding the flow class, determining the processing sequence (particularly binding one or more variables), evaluation of filter rules using the filter rule evaluator 15 and binding variables as described by the filter rules managed by the rule manager 15A. It is furthermore responsible for installation of flow cache entries with all bound variables through the flow cache module 14. Still further it may interact with the NIC (see FIG. 2) in order to get policy decisions (if only default decisions can be made locally). This interaction is preferably completely asynchronous, i.e. the flow classifier 13A does not comprise any waiting mode or state.

The filter rule evaluator 15 is used for filter rule evaluation. Within the FPC 10 it is particularly only used by the flow classifier 13A but it might well be reused by other means or functions needing such a functionality. It is particularly capable of handling multiple rule sets. The rule manager 15A is responsible for installation and deletion of rules and rule sets on command, for example from a configurator. Preferably it supports static configuration as well as dynamic configuration. Dynamic rules can be added at runtime without having any impact on-ongoing operations, i.e. the rule tables are prepared in an off-line area which can be activated when all necessary pre-processing has been completed.

Figure 7:
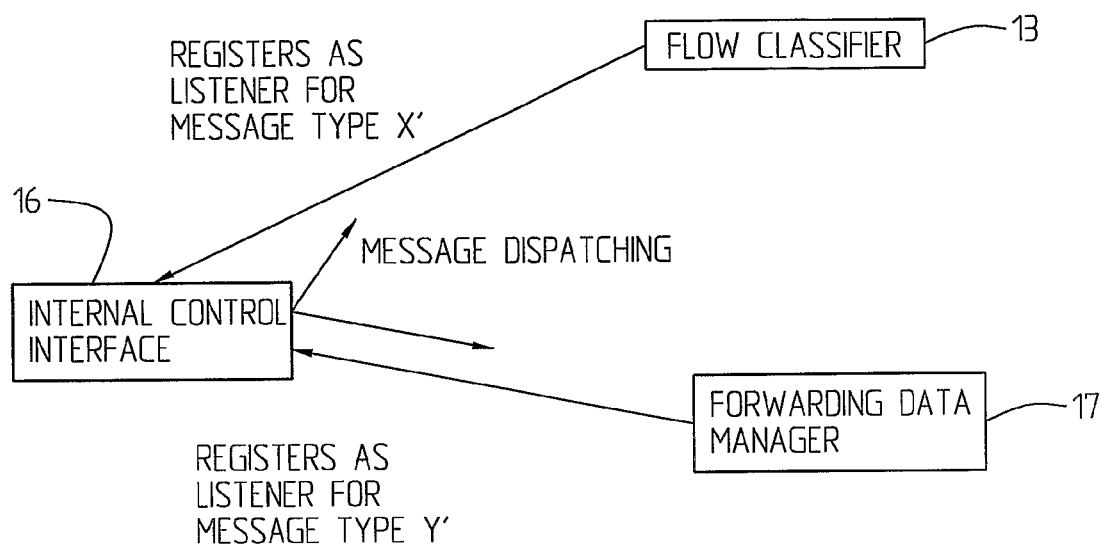

The internal control interface module 16, (c.f. FIG. 4 and FIG. 7) performs formatting and parsing of the internal control interface which particularly is TLV-based as discussed above. Furthermore it is responsible for dispatching messages to other modules which particularly register with the internal control interface module with the type of messages $(x_1, y_1)$ that they are handling, it may further handle load balancing of control traffic to a NIC 50, cf. FIG. 2.

The forwarding data manager 17, e.g. a module, is responsible for managing data related to internal and external forwarding as well as traffic mapping tables used by the packet pre-processor 11. It receives such managing data from a configurator (not shown) using the static control interface and it will install the data into data areas that can be accessed by the respective functions in the fast path. Preferably the forwarding data manager is a reusable component that can be reused by other units handling payload data.

The processing function control $18_F$ corresponds to the possible processing functions 18 of the fast path. None of them are necessary for the functioning of the invention but are merely included to illustrate that the FPC itself may comprise processing functions, in the slow path ($18_S$) and/or in the fast path ($18_F$).

In one embodiment protocol components are provided for the ARP and ICMP protocols, 21. Then the FPC will act as a host (e.g. the address to which internal forwarded data and control signaling is sent) for one or several IP addresses.

Figure 8:
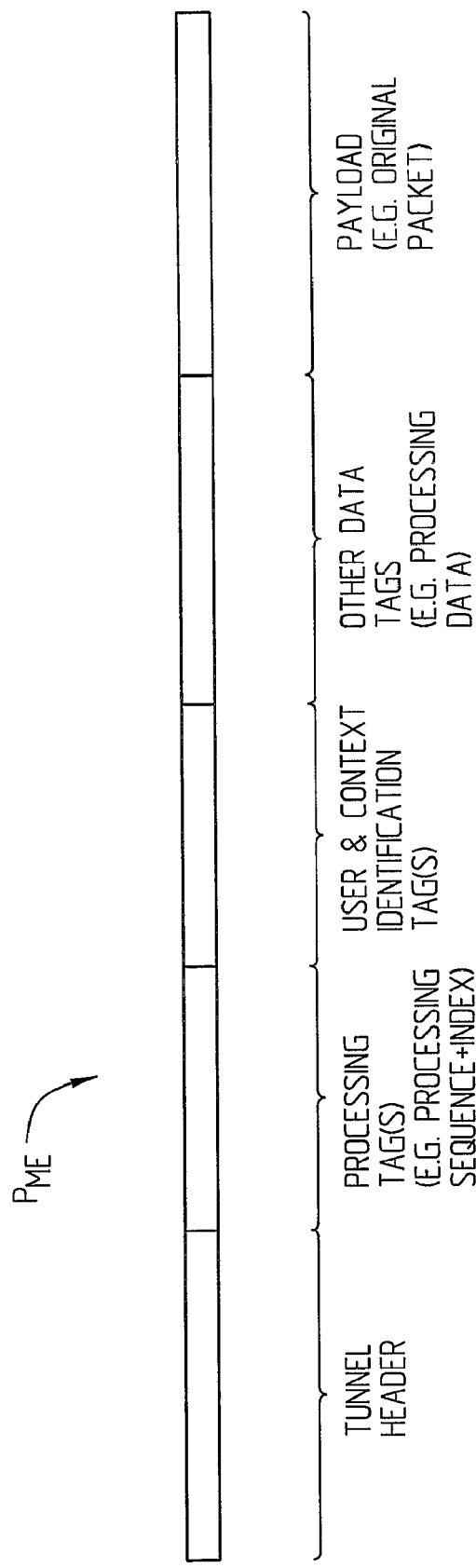
FIG. 8 shows an example of a packet format for internal forwarding and switching according to the present invention.

FIG. 8 illustrates one example of a packet format supporting the internal forwarding or switching of packets according to the inventive concept, i.e. packets supporting the internal protocol that can be used within and between arrangements of the invention. The packet $P_{ME}$ comprises a tunnel header which e.g. is TLV-based, a processing tag or tags which for example comprise processing sequence and an index providing information about the location in the processing sequence, user and context identification tag or tags, optionally one or more other data tags, e.g. processing data and the payload, e.g. the "original" packet.

In the following switching of flows to and from external units will be discussed. This should be done in such a way that the loss of efficiency and flexibility is kept as low as possible.

Advantageously any number of processing sequences to be defined is allowed where the processing function takes place. Still further, preferably a strict and static ordering of processing functions, for example cascading of processing functions, should be avoided. Still further, switching has to be kept efficient and no packets should be sent to processing functions unless they really have to. The flexibility and efficiency can be kept high among others due to the use of the classifier and internal forwarding as described above.

As far as external forwarding is concerned this may reduce problems as will be explained below. If a packet is sent back to the FPC after being processed by an external function, since the external function does not have an internal forwarder, the packet is externally forwarded as a raw packet to the external function. After processing the packet has to be returned to flow processing core since a new internal forwarding decision has to be made, and since the external function does not have an internal forwarder, as referred to above, and since the packet may have to be forwarded to another processing function. However, when the packet arrives at the FPC, it needs to be re-inspected/classified as no state is withheld for the packet, which is not desirable. If the external function having processed the packet has not made any changes to the packet header, the result of the inspection or classification will be exactly the same as the first time the packet entered the system. This means that, the packet may enter an endless loop.

Figure 9:
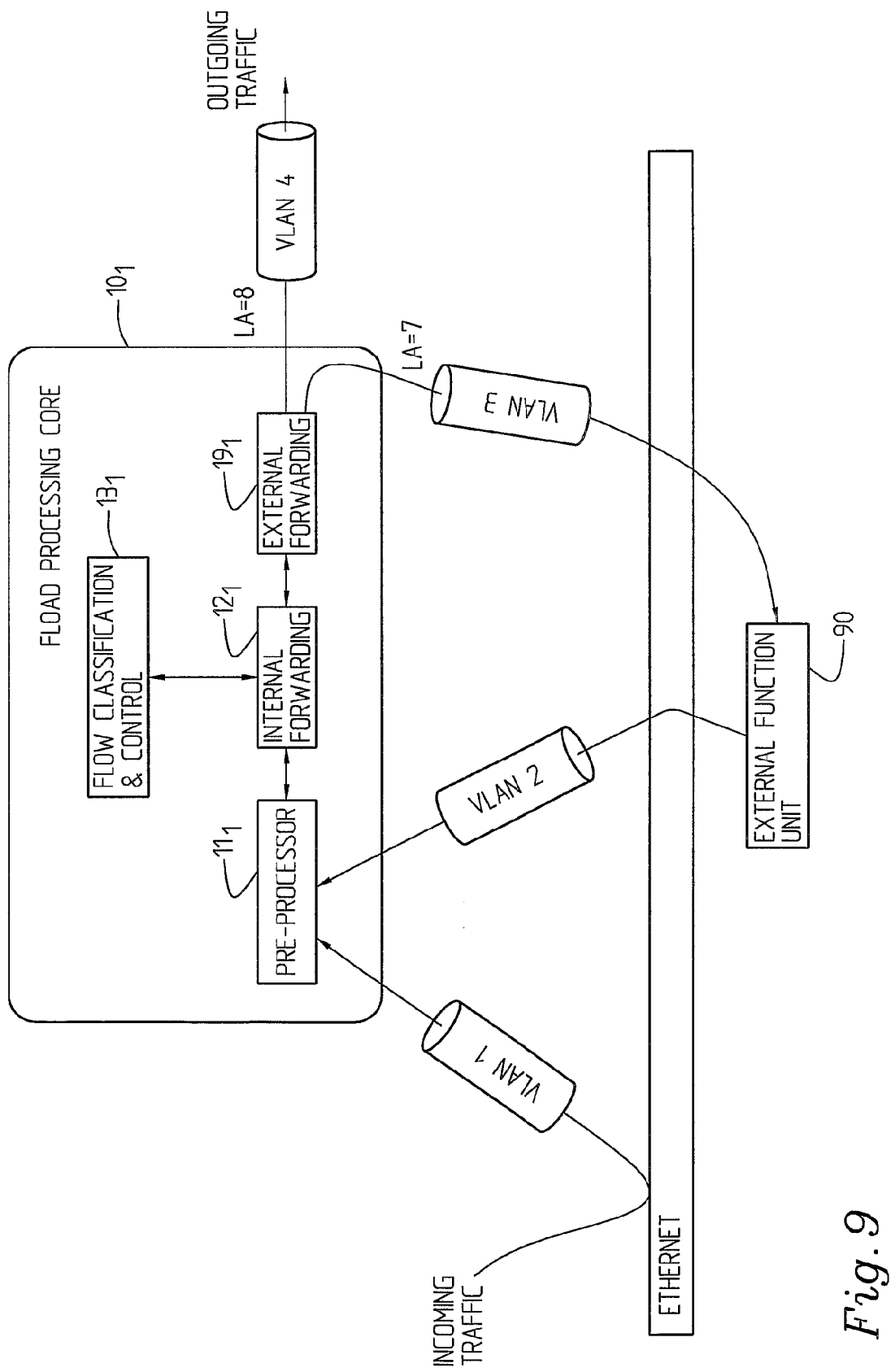
FIG. 9 shows one example of switching to an external unit according to the invention, FIG. 10 schematically illustrates how, in a particular embodiment, user identification can be provided for use at classification of a packet, FIG. 11 schematically illustrates binding of user session IP address for NAPT traffic, FIG. 12 schematically illustrates how access related information can be provided for use at classification of a packet, FIG. 13 schematically illustrates interaction in order to provide for user information, service information and access type information to be used at packet classification, and, FIG. 14 is a very schematical flow diagram describing the procedure when a packet for which no flow has been defined arrives at an arrangement according to the present invention.

However, according to the present invention this problem can be handled by taking advantage of virtual address tagging, for example Ethernet VLAN tagging, cf. FIG. 9. Hence, with reference to FIG. 9 it is supposed that a packet initially arrives on VLAN 1. The pre-processing means $11_1$ will detect the packet, and here, supposing that VLAN tagging is supported, the pre-processing $11_1$ means will extract the VLAN tag. The value or the VLAN tag will be used during inspection/classification in order to identify the flow and assign a processing sequence. It is here supposed that sequence A is selected which consists of logical address 2, logical address 7 in this order. Further a sequence is defined which is denoted sequence B, which here is supposed to consist of the steps with logical address 3, logical address 8 in this order. In this embodiment it is supposed that sequence A is selected. At some point in the processing sequence, it is supposed that the packet is to be sent to the external function 90. The processing sequence will then indicate that the packet is to be externally forwarded and it is sent to the external forwarding function. The external forwarder $19_1$ will look at the next hop "logical address" (LA=7) in the processing sequence and will make a forwarding decision, in this case it is supposed that packet will be sent on VLAN 3 to the external function. The external forwarding function 90 can here be seen as an agent acting on behalf of the external function. In this case it will behave as if it is implementing the function corresponding to LA=7. The external forwarding means $19_1$ operates on a forwarding table combining information about which VLAN that should be used, default route etc. In this case the route will indicate the IP address of the external function 90.

After processing has been terminated by the external function 90, the packet is returned to the flow processing core on a specific VLAN, here VLAN 2. The external function can be said to use the FPC as its default route and VLAN 2 as its default interface. If the external node, on the other hand, does not support VLAN tagging, a similar procedure may be performed by an intermediate Ethernet switch that sets the VLAN tag to 2 for all packets received on a specific port.

As the packet enters FPC 101 and the pre-processor $11_1$ again, a different VLAN tag will be extracted. Since the VLAN tag is part of the identification of the flow, which somehow is stored in the cache, the packet will now be treated as belonging to a different flow and can be assigned a different processing sequence; in FIG. 9 this is supposed to be flow B. The packet is now again sent through internal forwarding $12_1$ and will eventually leave the system. It is then again sent to the external forwarder $19_1$, but this time for leaving the system. As this processing sequence has a different terminating logical address, LA=8, a different forwarding decision will be made, i.e. it will not be sent again to the external function 90. The corresponding procedure may be repeated any number of times with any number of processing functions.

As can be seen the solution can easily be extended to a virtualized environment of multiple logical networks. If there for example are two logical networks both carrying traffic potentially needing to be sent to an external function, the external function may be assigned two ingress VLANs and egress VLANs. In that way the pre-processor can correctly set both the logical network ID and the origin variables of returning packets.

If VLAN tagging is not supported, or as an alternative to VLAN tagging, e.g. MAC addresses may be used. Then the origin variable could be set by the pre-processing means based on the MAC address of the sender.

Further, instead of using two processing sequences as in FIG. 9, before=A, after=B, the single processing sequence could be used. In that case the initial value of the processing index has to be set different through application of rules, the second time the packet enters the system, (3 rather than 1 in the shown example).

As referred to earlier in the application the basic switching, or classification, of flows may depend on a plurality of factors such as for example user (and user capabilities), the type of access used, the service addressed etc. In a particularly advantageous embodiment these factors can be taken into account in order to provide a dynamic and broad base that can be used for flow classification. Information about the user or knowledge of the user, may be needed in order to be able to charge the correct user and also in order to know what the user is allowed to do. Information about access may be needed in order to be able to optimize the service in view of the available resources at that access, and service information may be needed in order to be able to apply the relevant charging rates and also in order to be able to know how to optimize a content. Mechanisms are thus needed in order to enable switching and classification based on one or more of these factors. Of course also, or alternatively, other factors may be of interest but only these factors will be further discussed in this document.

Figure 10:
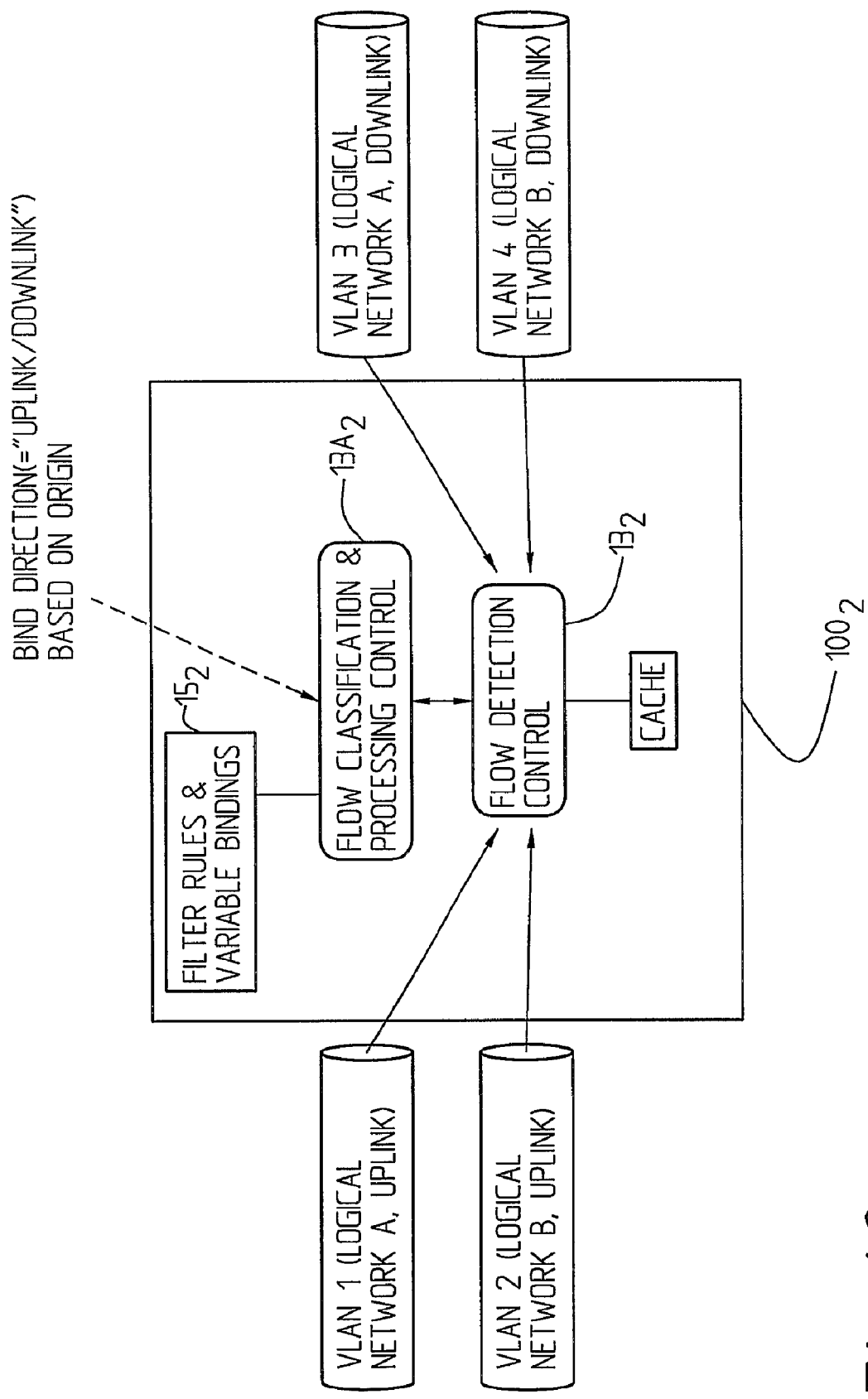

FIG. 10 illustrates an example of how user or a user session can be identified. It is advantageous to be able to bind data traffic to the user session generating it since policy decisions as well as many processing functions have to be applied individually on a per user session.

Low level packet processing functions use the IP address of the user IP session as the primary means to bind flows and streams to users. Since the IP address is not globally unique, the logical network, e.g. APN/VPN, may also be used to uniquely bind traffic to a user session. (At higher control layers other identities might be used, such as MSISDN, NAI etc.)

Generally the user session IP address is contained in the packet and the logical network is determined through the interface over which the packet arrived. There is however also a need to know whether the source IP address or the destination IP address is needed in order to bind a flow to a user. Sometimes this may be obvious from classifying the flow and applying the filter bindings; a filter can bind the user session IP address. In some cases it is however not sufficient, e.g. for peer-to-peer traffic. Then the classifier (and the flow cache) is used to establish the difference by looking at a variable here called "origin" which is set based on the interface, e.g. the VLAN, through which the packet arrived. At classification there will be a binding of a "direction" variable which indicates the direction of the flow, i.e. uplink or downlink. For uplink traffic the source IP address binds the user and for downlink traffic the destination IP address binds the user.

FIG. 10 illustrates part of a FPC $100_2$ with flow classification and processing control means $13A_2$ and flow detection and control means $13_2$ which communicate with a cache. Filter rules and variable bindings may be used for classification purposes. It is supposed that direction is bound in a flow classification and processing control means based on "origin", i.e. uplink or downlink. A packet may arrive over VLAN 1, here comprising logical network A, uplink, or VLAN 2, logical network B, uplink, VLAN 3, logical network A, downlink or VLAN 4, logical network B, downlink. For VLAN 1 and VLAN 2 "origin" is in the flow detection controller 132 set to "access" and the logical network is set to A or B respectively, whereas for VLANs 3 and 4, downlink direction, origin is set to "network" and the logical network is set to A or B.

Figure 11:
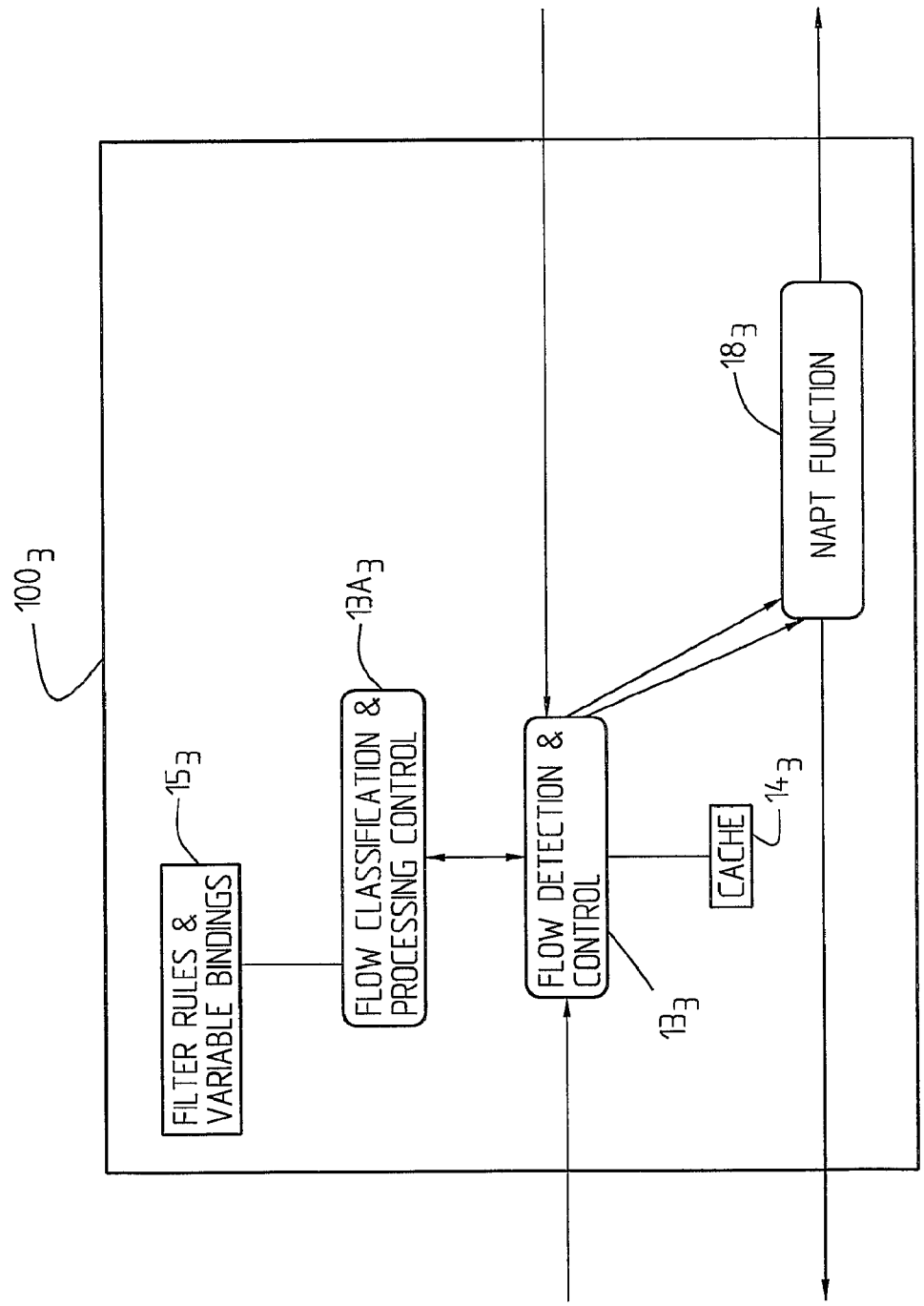

In some situations there may be a NAPT function $18_3$ or similar in the processing chain for a flow, see FIG. 11. Then some special handling may be required since the downlink packets will not all contain the user session IP address. Such a situation is illustrated in the arrangement $100_3$ of FIG. 11, which shows how a user session IP address can be bound for NAPT traffic. A filter is assumed to have been created that is unique per user IP session and it can therefore be used to bind a variable that will carry the user session IP address. In other aspects the functioning is similar to that of FIG. 10 and it will therefore not be further described herein. Corresponding means are given the same reference signs as in FIG. 10 but with index 3.

As referred to above, another factor that can be used is information about the type of access. Preferably an arrangement or a method according to the present invention is independent of access or access type that is used but preferably at the same time it is aware of the type of access used in order to be able to use this factor for variable binding etc. Access independent here means that the respective components do not have any tight coupling with any access specific parts and, from an implementational point of view, it can be decoupled, e.g. provided on a different platform. The advantage thereof is that the same components can be used in solutions for different access technologies, for multi-access solutions and they may also be used in configurations which are completely access agnostic.

Hence, independence of access is clearly advantageous but still at least to some degree, access awareness is desirable. In an advantageous implementation it is possible to differ between different access links for policies and processing. For example in the case of GPRS there may be a need to differ between primary and secondary PDP context, there may for example be authorization of certain flows only for the primary PDP context, different charging rates may be applied etc. Also in a multi-access scenario it is clearly advantageous to have some information about access or access type. An optimizer could for example be by-passed when switching to WLAN from GPRS, or the charging rate may change.

Figure 12:
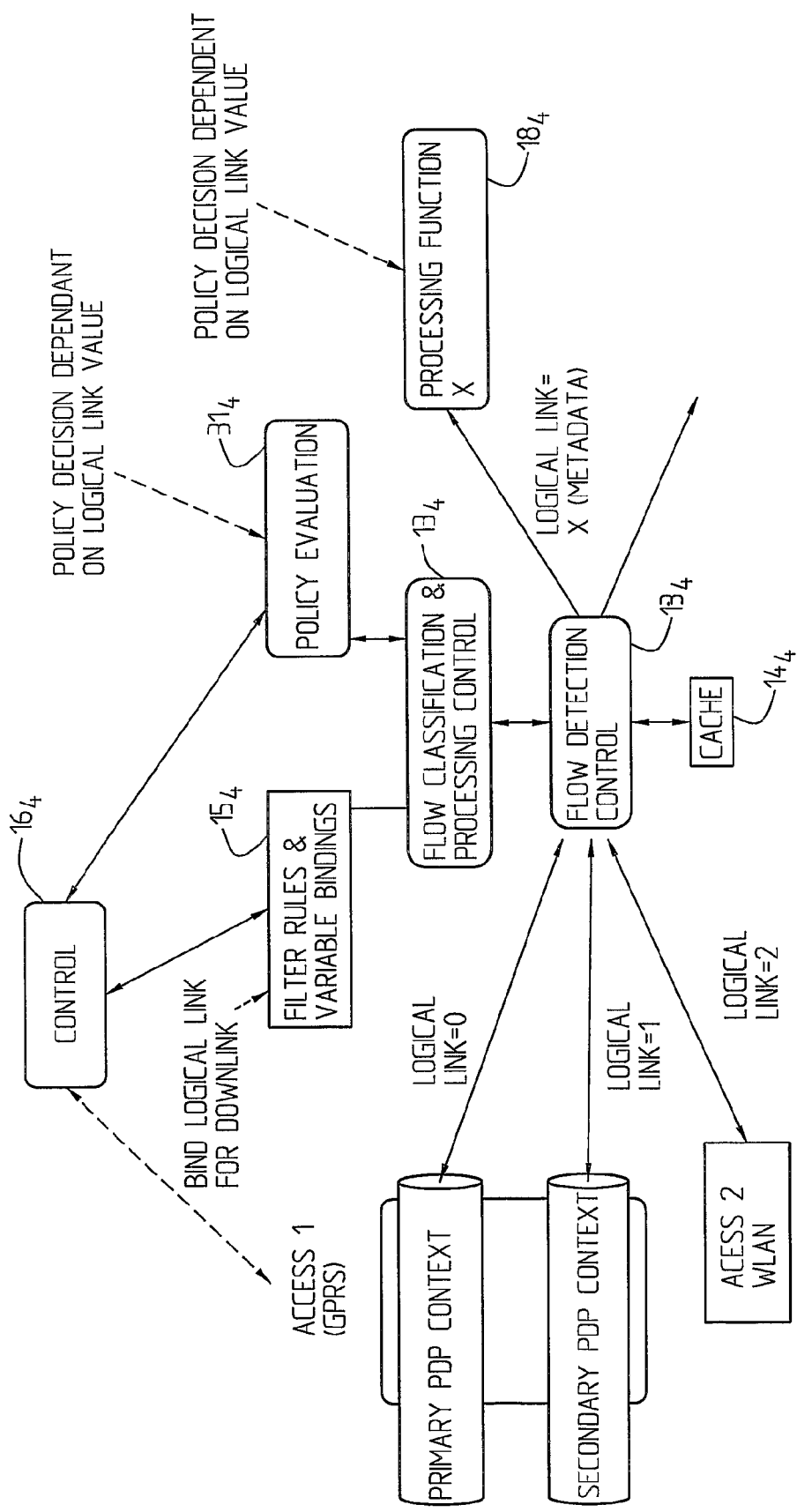

FIG. 12 shows an arrangement according to the invention with different GPRS access links, primary PDP context, secondary PDP context and a WLAN access link. According to the inventive concept access information or access awareness can be achieved through implementation of logical links. Different access technologies and access links can he mapped to unique logical links as can be seen from FIG. 12 wherein a primary PDP context is mapped to logical link 0 whereas a secondary PDP context is mapped to logical link 1 and WLAN access is mapped to logical link 2. For the uplink the mapping is done on the ingress from the access, i.e. the logical link variable is bound to map to the access or link on which the packet arrived. For the downlink the mapping is done during flow classification, i.e. there is a filter that binds the logical link value for the flow. On the communication interface from/ towards the access node, there needs to be a way to convey such information. This can be provided for in different manners. In one embodiment an existing part of the IP header is used. Alternatively VLAN tags can be used. Mapping is (irrespectively of used method) done to/from the logical links within e.g. a NIC system 50, cf. FIG. 2.

Explicit information about access may be signaled through the control function and may for example provide a NIC with information about which access technology that currently is used, e.g. multi-access and/or filters relating to how traffic should be mapped to the logical links. When a secondary PDP context is established in GPRS, a new filter rule has for example to be installed that will map some particular downlink traffic to that PDP context, a so called Traffic Flow Template (TFT) filter. Preferably the policy evaluation that is done to determine the applicable processing sequence for a packet will use a logical link as one of its input parameters. This means that the decision may be different depending on used PDP context. The logical link ID will also be forwarded with the packet to the processing functions as metadata. Depending on logical link a different charging rate may for example be applied for traffic on a secondary PDP context. Multi-access can be handled in a similar way. If the user for example switches from GPRS to WLAN (or vice versa), a new filter can be activated mapping all traffic to the logical link mapping to WLAN. This can be done even if the end user IP address does not change (which it should not). All the mechanisms discussed above are access independent in the sense that all access related information can be communicated through generic interfaces requiring no tightly binding with the functions implementing the access technology itself. The installed means are denoted with the same reference signs as in the preceding figures, but with the index 4.

In order to still further increase or optimize the classification, information about access service constitutes an important factor that with advantage can be taken into account in order to be able to appropriately allow for a service based charging, service based authorization, service adaption etc.

Service information or service awareness can be provided for in different manners. In one embodiment services are identified with a particular IP address, which is similar to the provisioning of the user information as referred to above. Alternatively may for example port numbers be used to differentiate between different services. IP filter rules may be used to set for example the processing sequence based on this information. In order to still further increase the so called service awareness, selected flows can be switched to a specialized unit for performing a deeper analysis of the flows to determine the service content.

Figure 13:
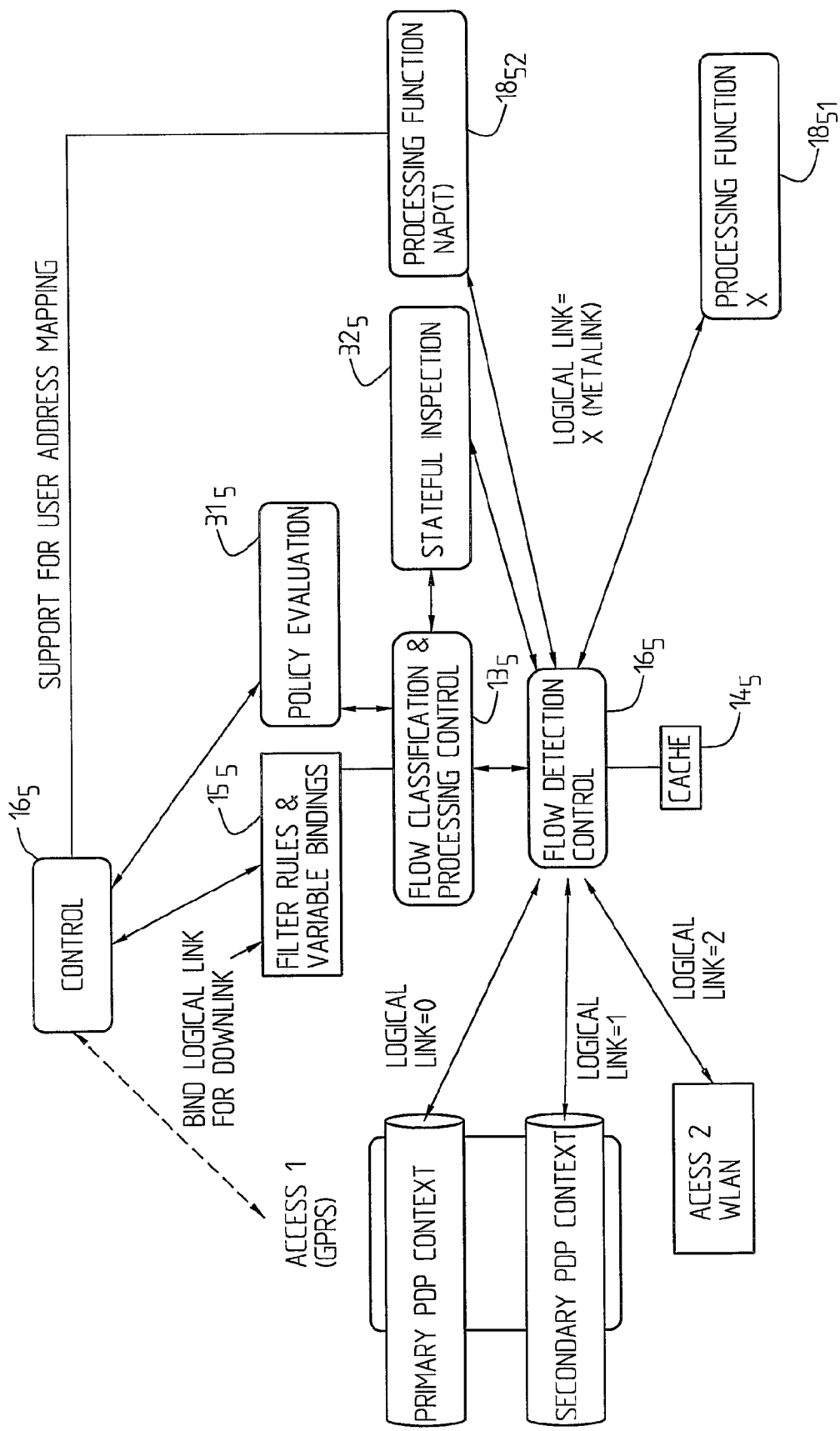

FIG. 13 shows an implementation of how to provide for interaction between different kinds of information that may be used for appropriately classified flows, such as user information, access information and service information. It should be clear that these different kinds of information and how this information can be identified or established, depend on each other. User related information is, as mentioned above, dependent on IP address but it may also be dependent on different addresses for example due to NAPTs and in fact a user may be multi-homed, using multiple accesses etc. Service information may trigger the set up of new user flows which may require new NAPT addresses for the user. Thus the service information indirectly affects the user awareness or user information.

Figure 14:
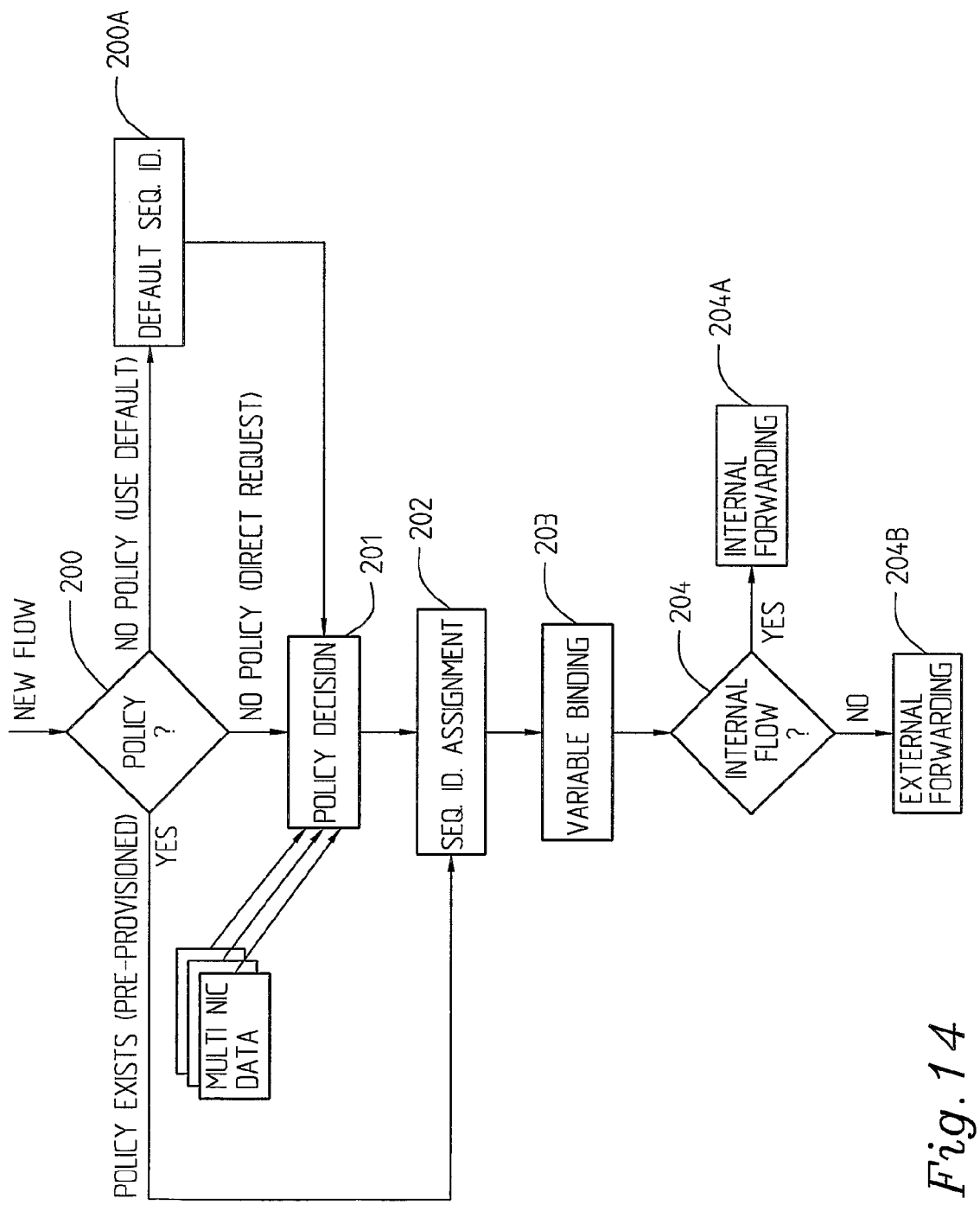

FIG. 14 is a very schematical flow diagram describing one implementation of the inventive concept when a packet of a new flow arrives. It is first examined if there is any policy defined, 200, for the flow to which the arriving packet belongs. If a policy exists, processing sequence identity (and index) is assigned, 202, optionally variables are bound, 203, and it is examined whether it belongs to an internal flow, 204, and hence is to be internally forwarded, 204A, or if not, in which case it is to be externally forwarded, 204B. If there is no policy defined, a default sequence identity may be set, 200A, temporarily, or if, or when, possible policy decisions are fetched, 201, a sequence ID is assigned, 202, etc. as described above. Particularly a default sequence ID is used until policy decisions are available.

In a particularly advantageous embodiment a signaling interface towards the external function is provided for informing the external function about address mappings, user profiles etc.

It is an advantage of the invention that a distributed system can be provided where different functions can be applied in different flows and where the classification of the flow is only done once and not for each function. It is also an advantage that several components, such as the internal forwarding means, can be reused for various processing functions.

It is an advantage of the invention that new processing functions easily can be added, for example new hardware units, without having any impact on the FPC except that it has to be provided with filter rules and forwarding tables such that the new function may be used. Hence the system can easily be built out and adapted.

It is also an advantage that, since all unnecessary switching through processing functions can be avoided, the load on processing functions and as well as on the network connecting the functions can be kept low. A particular advantage is that, in particular implementations, traffic can be controlled and switched to external functions without requiring the external function supporting any specific protocols e.g. encapsulation protocols etc. since packets to external functions are sent un-encapsulated. It is also an advantage of the invention, in such cases, that also the load on such external functions can be controlled or reduced. Still further it is an advantage that packet latency can be controlled. It is particularly an advantage of the invention that a user can be identified in the case of NAT. Still further it is an advantage that specific logical networks or links to specific accesses and the interaction with the policy and classification system is enabled, and additionally that services can be identified, particularly where control and data plane is separated, and be associated with a user.

In embodiments in which the problems associated with external units are concerned, it is a particular advantage that externally forwarded or processed data can be mapped and handled without all flow state information being lost. Still further it is an advantage that VLAN tagging can be used to control processing orders, and particularly for the dual purpose of controlling processing order and still maintaining network virtualization. Still further it is a particular advantage of the invention that it allows for an adaptive external forwarding, hence allowing forwarding either to an external function or to a router.

It should be clear that the invention is not limited to the specifically illustrated embodiments but that it can be varied in a number of ways within the scope of the appended claims.

Particularly it should be clear that it may or may not relate to cases handling the problem with external functions, and that factors such as user information, service information and access type information etc. can be used or not and to various extent depending on implementation and desired degree of flow sequence classification.

Still further the invention is not limited to the use of Ethernet or VLAN tagging but also other techniques can be used, the main thing being that somehow information about flow sequence and preferably also about location in a flow sequence, is provided to a packet such that such information can be taken advantage of in other units or arrangements or in different parts or units of the arrangement itself.

The invention claimed is:

1. An arrangement for directing flows of data packets in a communication system to processing units for performing operations on the data packets, said arrangement comprising:
a flow-processing core processor that provides:
classifying means for classifying data packet flows and defining an applicable processing flow sequence for each packet flow;
distributing means for directing the packet flows to processing units according to the applicable flow sequence for each packet flow, wherein the distributing means includes both internal and external forwarding means, said internal forwarding means storing logical addresses for internal processing units that process packet flow processing sequence information, and storing IP addresses for internal processing units that do not process packet flow processing sequence information;
means for indicating a current position of each packet flow in the respective applicable processing flow sequence; and
means for determining packet flow sequence information such that re-classification of already classified packets is avoided.

2. The arrangement recited in claim 1, wherein the distributing means also includes forwarding control means for distributing a classified packet of a packet flow.

3. The arrangement recited in claim 1, further comprising a functional processing unit for performing at least one payload processing function on the data packets.

4. The arrangement recited in claim 3, wherein the functional processing unit includes means for performing a firewall-related processing function.

5. The arrangement recited in claim 1, wherein the classifying means includes means for adding metadata information to incoming packets upon classification, said metadata comprising information about the appropriate flow processing sequence.

6. The arrangement recited in claim 5, wherein the metadata includes a processing sequence identity and an index marking which is updated as a processing step of the flow processing sequence.

7. The arrangement recited in claim 5, wherein at least one of the processing steps of a processing flow sequence depends on dynamically assigned variables, and the arrangement includes means for binding processing-specific variables to the metadata.

8. The arrangement recited in claim 1, wherein the distributing means also includes forwarding tables holding information relating to distribution of packets to processing units or to arrangements supporting sending of packet flow sequence information added to packets.

9. The arrangement recited in claim 1, wherein each processing flow sequence includes operations selected from a group consisting of authorization operations, policing operations, charging data related operations, and QoS control operations.

10. The arrangement recited in claim 1, wherein for packets that cannot be classified into a packet flow with a given processing flow sequence, the arrangement allocates a temporary default processing flow requiring re-classification until a permanent classification can be performed.

11. The arrangement recited in claim 1, wherein the distributing means directs permanently classified packets into a fast path and directs unclassified packets or default classified packets into a slow path, wherein the means for determining packet flow sequence information sends packets to the appropriate flow or sends packets between the fast flow and the slow flow.

12. The arrangement recited in claim 1, further comprising pre-processing means for analyzing incoming packets, for creating a temporary packet storage, and for identifying and differentiating between internally tunneled payload packets and un-tunneled packets.

13. The arrangement recited in claim 12, wherein the pre-processing means includes means for analyzing Ethernet VLAN packet tags.

14. The arrangement recited in claim 1, wherein after classification of packets, the distributing means communicates with distributing means in other arrangements if, according to the classification, the other arrangements are handling the relevant processing steps to which the packets are forwarded.

15. The arrangement recited in claim 1, further comprising means for determining a user session associated with received data packets and for binding the packets to the determined user session.

16. The arrangement recited in claim 1, further comprising means for mapping different access links to respective unique logical links, thereby providing for access link technology awareness.

17. The arrangement recited in claim 1, further comprising:
means for associating services with particular IP-addresses; and
means for determining a service content of received packets.

18. The arrangement recited in claim 1, wherein the arrangement is implemented in a gateway service node.

19. An arrangement for directing flows of data packets in a communication system to processing units for performing operations on the data packets, said arrangement comprising:
a flow-processing core processor that provides:
classifying means for classifying data packet flows and defining an applicable processing flow sequence for each packet flow;
distributing means for directing the packet flows to processing units according to the applicable flow sequence for each packet flow, wherein the distributing means includes both internal and external forwarding means, said external forwarding means storing logical addresses for external processing units or arrangements, wherein when a logical address indicates an external unit, the data packet is sent without flow sequence information, and the packet is provided with an indication that it should be returned to a sending arrangement;
means for indicating a current position of each packet flow in the respective applicable processing flow sequence; and
means for determining packet flow sequence information such that re-classification of already classified packets is avoided.

20. The arrangement recited in claim 19, wherein packets received from an external unit indicated by a logical address are classified or re-classified using the logical address as an additional input for classification.

21. A packet-switched communication system comprising:
a plurality of nodes supporting communication of packet data and providing access over a number of access networks; and
a plurality of arrangements for directing flows of data packets in the communication system to processing units for performing operations on the data packets, each of the arrangements comprising:
classifying means for classifying data packet flows and defining an applicable processing flow sequence for each packet flow;
distributing means for directing the packet flows to processing units according to the applicable flow sequence for each packet flow, wherein the distributing means includes both internal and external forwarding means, said internal forwarding means storing logical addresses for internal processing units that process packet flow processing sequence information, and storing IP addresses for internal processing units that do not process packet flow processing sequence information;
means for indicating a current position of each packet flow in the respective applicable processing flow sequence; and
means for determining packet flow sequence information such that re-classification of already classified packets is avoided.

22. A method of directing flows of data packets in a communication system to processing units for performing operations on the data packets, said method comprising the steps of:
inspecting a packet received from an access network by examining at least identity information, packet type, origin and destination information;
determining whether an applicable processing flow sequence is already established for the packet based on the inspecting step;
if an applicable processing flow sequence is already established for the packet:
associating the packet with the applicable flow sequence and a relevant processing step in the flow sequence; and
forwarding the packet to a relevant processing unit in the flow sequence;
if an applicable processing flow sequence is not already established for the packet:
classifying the packet dependent upon at least one of type of access, user, and type of service;
assigning a packet flow sequence comprising a relevant applicable processing step if an applicable policy is available;
classifying the packet with a temporary or default classification if an applicable policy is not available; and forwarding the packet to the relevant processing unit, wherein the forwarding step includes selectively forwarding the packet to an internal processing unit or an external processing unit, wherein logical addresses are utilized for external processing units and for internal processing units that process packet flow processing sequence information, and IP addresses are utilized for internal processing units that do not process packet flow processing sequence information.

23. The method as recited in claim 22, wherein the step of determining whether an applicable processing flow sequence is already established for the packet includes utilizing a result of the inspecting step to access a temporary flow information holding means.

24. The method as recited in claim 22, further comprising the step of adding metadata information comprising flow processing sequence information and an indication relating to a current, preceding, or subsequent processing step in the sequence, such that the packet, at reception in another processing unit, can be appropriately forwarded without re-classification.

25. The method as recited in claim 22, wherein the communication system supports Ethernet VLAN packet tags, and the step of inspecting the packet includes examining the packet's VLAN packet tag.

* * * * *

UNITED STATES PATENT AND TRADEMARK OFFICE
CERTIFICATE OF CORRECTION

PATENT NO. : 7,773,598 B2
APPLICATION NO. : 11/722182
DATED : August 10, 2010
INVENTOR(S) : Lindholm et al.

It is certified that error appears in the above-identified patent and that said Letters Patent is hereby corrected as shown below:

On the Title Page, in Item (54), in Title, in Column 1, Line 3, delete "COMMUNICATIONS" and insert -- COMMUNICATION --, therefor.

In Fig. 5, Sheet 5 of 14, delete "8. TO PROCESS." and insert -- 8. TO PROCESS --, therefor.

In Column 1, Line 3, delete "COMMUNICATIONS" and insert -- COMMUNICATION --, therefor.

In Column 1, Line 24, delete "IF" and insert -- IP --, therefor.

In Column 14, Line 7, delete "tables," and insert -- tables. --, therefor.

In Column 17, Line 39, delete "$11_1$ means" and insert -- means $11_1$ --, therefor.

In Column 18, Line 4, delete "101" and insert -- $10_1$ --, therefor.

In Column 19, Line 25, delete "132" and insert -- $13_2$ --, therefor.

In Column 20, Line 8, delete "he" and insert -- be --, therefor.

Signed and Sealed this

Twenty-sixth Day of October, 2010

David J. Kappos
*Director of the United States Patent and Trademark Office*